(12) United States Patent
Droz et al.

(10) Patent No.: US 11,054,505 B2
(45) Date of Patent: Jul. 6, 2021

(54) LONG RANGE STEERABLE LIDAR SYSTEM

(71) Applicant: Waymo LLC, Mountain View, CA (US)

(72) Inventors: Pierre-yves Droz, Los Altos, CA (US); Gaetan Pennecot, San Francisco, CA (US); Anthony Levandowski, Berkeley, CA (US); Drew Eugene Ulrich, San Francisco, CA (US); Zach Morriss, San Francisco, CA (US); Luke Wachter, San Francisco, CA (US); Dorel Ionut Iordache, Walnut Creek, CA (US); William McCann, San Francisco, CA (US); Daniel Gruver, San Francisco, CA (US); Bernard Fidric, Cupertino, CA (US); Samuel William Lenius, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 414 days.

(21) Appl. No.: 15/881,049

(22) Filed: Jan. 26, 2018

(65) Prior Publication Data

US 2018/0149732 A1   May 31, 2018

Related U.S. Application Data

(63) Continuation of application No. 14/679,683, filed on Apr. 6, 2015, now Pat. No. 9,880,263.

(51) Int. Cl.
*G01S 7/48* (2006.01)
*G01S 7/481* (2006.01)
(Continued)

(52) U.S. Cl.
CPC .......... *G01S 7/4802* (2013.01); *G01S 7/4817* (2013.01); *G01S 17/86* (2020.01); *G01S 17/87* (2013.01);
(Continued)

(58) Field of Classification Search
CPC ................................ G08G 1/161; G06F 7/00
See application file for complete search history.

(56) References Cited

U.S. PATENT DOCUMENTS

| 5,808,728 A | 9/1998 | Uehara |
| 8,306,273 B1 | 11/2012 | Gravseth et al. |

(Continued)

FOREIGN PATENT DOCUMENTS

| JP | H05248862 | 9/1993 |
| JP | H08122060 | 5/1996 |

(Continued)

OTHER PUBLICATIONS

International Searching Authority, International Search Report and Written Opinion, dated Jun. 20, 2016, issued in connection with International Patent Application No. PCT/US2016/021542, filed on Mar. 9, 2016, 15 pages.

(Continued)

*Primary Examiner* — Luke D Ratcliffe
(74) *Attorney, Agent, or Firm* — McDonnell Boehnen Hulbert & Berghoff LLP

(57) ABSTRACT

Systems and methods are described that relate to a light detection and ranging (LIDAR) device. The LIDAR device includes a fiber laser configured to emit light within a wavelength range, a scanning portion configured to direct the emitted light in a reciprocating manner about a first axis, and a plurality of detectors configured to sense light within the wavelength range. The device additionally includes a controller configured to receive target information, which (Continued)

may be indicative of an object, a position, a location, or an angle range. In response to receiving the target information, the controller may cause the rotational mount to rotate so as to adjust a pointing direction of the LIDAR. The controller is further configured to cause the LIDAR to scan a field-of-view (FOV) of the environment. The controller may determine a three-dimensional (3D) representation of the environment based on data from scanning the FOV.

20 Claims, 17 Drawing Sheets

(51) Int. Cl.
*G01S 17/87* (2020.01)
*G01S 17/86* (2020.01)
*G01S 17/931* (2020.01)
G01S 13/931 (2020.01)

(52) U.S. Cl.
CPC ... *G01S 17/931* (2020.01); *G01S 2013/93271* (2020.01); *G01S 2013/93272* (2020.01); *G01S 2013/93273* (2020.01); *G01S 2013/93274* (2020.01)

(56) References Cited

U.S. PATENT DOCUMENTS

| | | | |
|---|---|---|---|
| 8,610,881 B2 | 12/2013 | Gammenthaler | |
| 8,692,980 B2 | 4/2014 | Gilliland et al. | |
| 8,767,186 B2 | 7/2014 | Lu et al. | |
| 8,818,609 B1 | 8/2014 | Boyko et al. | |
| 9,383,753 B1* | 7/2016 | Templeton | G01S 17/42 |
| 2003/0043058 A1 | 3/2003 | Jamieson et al. | |
| 2004/0233414 A1 | 11/2004 | Jamieson et al. | |
| 2005/0057741 A1* | 3/2005 | Anderson | G01S 17/89 356/5.01 |
| 2009/0048750 A1* | 2/2009 | Breed | G08G 1/161 701/70 |
| 2010/0063736 A1 | 3/2010 | Hoetzer | |
| 2011/0006943 A1 | 1/2011 | Shaffer | |
| 2012/0008129 A1 | 1/2012 | Lu et al. | |
| 2012/0050726 A1 | 3/2012 | Novak et al. | |
| 2014/0111812 A1* | 4/2014 | Baeg | G01S 7/4814 356/610 |
| 2014/0166866 A1 | 6/2014 | Gehring et al. | |
| 2014/0293263 A1 | 10/2014 | Justice et al. | |
| 2015/0055117 A1 | 2/2015 | Pennecot et al. | |
| 2015/0062555 A1 | 3/2015 | Kim | |
| 2015/0131080 A1* | 5/2015 | Retterath | G01S 17/93 356/5.01 |
| 2015/0286340 A1 | 10/2015 | Send et al. | |
| 2016/0245903 A1* | 8/2016 | Kalscheur | G01S 17/42 |

FOREIGN PATENT DOCUMENTS

| | | |
|---|---|---|
| JP | 2005104434 | 4/2005 |
| JP | 2007503004 | 2/2007 |
| JP | 2013537487 | 10/2013 |
| JP | 2014089691 | 5/2014 |
| WO | 2012/172580 | 12/2012 |
| WO | 2014/112911 | 7/2014 |

OTHER PUBLICATIONS

European Patent Office, Supplemental European Search Report dated Nov. 8, 2018, issued in connection with European Patent Application No. EP 16777022, 7 pages.

* cited by examiner

LONG RANGE STEERABLE LIDAR SYSTEM

CROSS-REFERENCE TO RELATED APPLICATION

The present patent application is a non-provisional continuation application claiming priority to U.S. patent application Ser. No. 14/679,683 filed on Apr. 6, 2015, the contents of which are hereby incorporated by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

One such sensor is a light detection and ranging (LIDAR) device. A LIDAR can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

In a first aspect, a device is provided. The device includes a light detection and ranging (LIDAR) device. The LIDAR device includes a light source configured to emit light within a wavelength range. The light source includes a fiber laser. The LIDAR device also includes a scanning portion configured to direct the emitted light in a reciprocating manner about a first axis and a plurality of detectors configured to sense light within the wavelength range. The device further includes a housing and a rotational mount configured to rotate about a second axis. At least the scanning portion is disposed within the housing and a wall of the housing includes a light filter configured to allow light within the wavelength range to propagate through the light filter. The device additionally includes a controller configured to receive target information. The target information is indicative of at least one of: a type of object, a size of an object, a shape of an object, a position, a location, or an angle range. The controller is additionally configured to, in response to receiving the target information, cause the rotational mount to rotate so as to adjust a pointing direction of the LIDAR. The controller is further configured to cause the LIDAR to scan a field-of-view (FOV) of the environment. The FOV extends away from the LIDAR along the pointing direction. The controller is yet further configured to determine a three-dimensional (3D) representation of the environment based on data from scanning the FOV.

In a second aspect, a system is provided. The system includes a vehicle and a sensing device configured to provide environmental data indicative of an environment around the vehicle. The sensing device is coupled to the vehicle. The system also includes a light detection and ranging (LIDAR) device. The LIDAR device is coupled to the vehicle. The system further includes a controller configured to receive the environmental data and determine, based on the environmental data, target information. The target information is indicative of at least one of: a type of object, a size of an object, a shape of an object, a position, a location, or an angle range. The controller is also configured to cause the rotational mount to rotate so as to adjust a pointing direction of the LIDAR based at least on the target information and cause the LIDAR to scan a field-of-view (FOV) of the environment. The FOV extends away from the LIDAR along the pointing direction. The controller is further configured to determine a three-dimensional (3D) representation of the environment based on data from scanning the FOV.

In a third aspect, a method is provided. The method includes receiving target information by a controller of a light detection and ranging (LIDAR) device. The target information is indicative at least one of: a type of object, a size of an object, a shape of an object, a distance, a position, or an angle range. The method also includes causing a light source of the LIDAR to emit light within a wavelength range. The light source includes a fiber laser. The method further includes causing a scanning portion of the LIDAR to direct the emitted light in a reciprocating manner about a first axis and in response to receiving the target information, causing a rotational mount coupled to the LIDAR to rotate so as to adjust a pointing direction of the LIDAR. The rotational mount is configured to rotate about a second axis. The method yet further includes causing the LIDAR to scan a field-of-view (FOV) of the environment. The FOV extends away from the LIDAR along the pointing direction. The method also includes determining a three-dimensional (3D) representation of the environment based on data from scanning the FOV.

Other aspects, embodiments, and implementations will become apparent to those of ordinary skill in the art by reading the following detailed description, with reference where appropriate to the accompanying drawings.

DETAILED DESCRIPTION

Figure 1A:
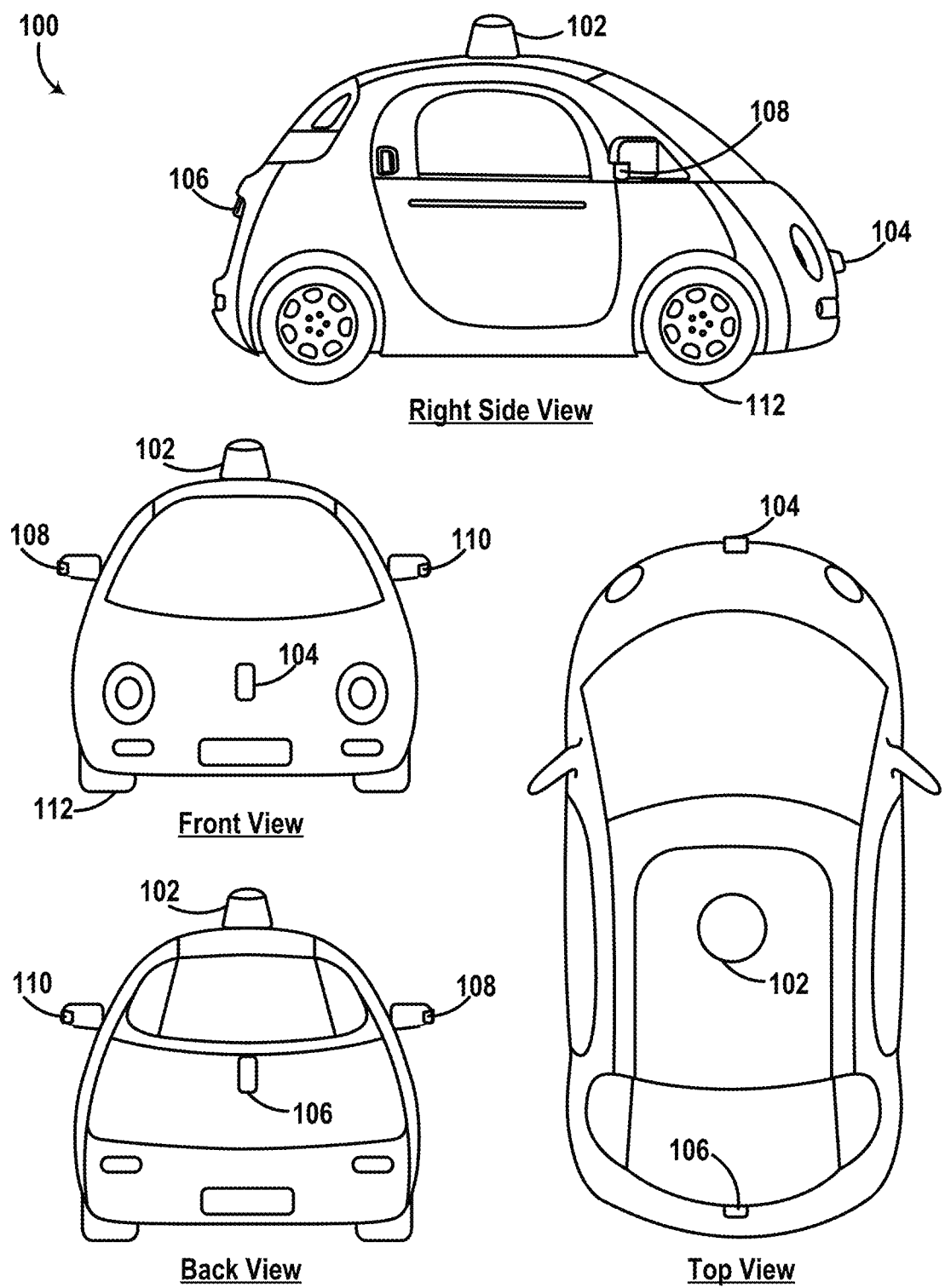
FIG. 1A illustrates several views of a vehicle, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

A vehicle may include a plurality of sensors configured to sense various aspects of the environment around the vehicle. For example, the vehicle may include a plurality of LIDAR devices with different fields of view, ranges, and/or purposes. In one example, a LIDAR device may include a single beam with a narrow laser beam spread. The laser beam spread may be about 0.1°×0.03° resolution, however other beam resolutions are possible. The LIDAR system may be mounted to a roof of a vehicle, although other mounting locations are possible.

The laser beam may be steerable over 360° about a vertical axis extending through the vehicle. For example, the LIDAR system may be mounted with a rotational bearing configured to allow the LIDAR system to rotate about a vertical axis. A stepper motor may be configured to control the rotation of the LIDAR system. Furthermore, the laser beam may be steered about a horizontal axis such that the beam can be moved up and down. For example, a portion of the LIDAR system, e.g. various optics, may be coupled to the LIDAR system mount via a spring. The various optics may be moved about the horizontal axis such that the laser beam is steered up and down. The spring may include a resonant frequency. The resonant frequency may be around 140 Hz. Alternatively, the resonant frequency may be another frequency. The laser beam may be steered using a combination of mirrors, motors, springs, magnets, lenses, and/or other known means to steer light beams.

The laser may be a fiber laser that produces 1550 nm laser light, although other wavelengths are possible. Furthermore, the pulse repetition rate of the LIDAR light source may be 4 Hz. The effective range of such a LIDAR system may be 300 meters, or more.

The laser beam may be steered by a control system of the vehicle or a control system associated with the LIDAR system. For example, in response to the vehicle approaching an intersection, the LIDAR system may scan for oncoming traffic to the left and oncoming traffic to the right. Other sensing scenarios are possible.

In an example embodiment, the LIDAR system may be steered so as to identify particular objects. For example, the LIDAR system may be operable to identify the shoulders or another part of a pedestrian. In another example, the LIDAR system may be operable to identify the wheels on a bicycle.

The LIDAR system described herein may operate in conjunction with other sensors on the vehicle. For example, the LIDAR system may be used to identify specific objects in particular situations. Target information may be determined based on data from any one of, or a combination of, other sensors associated with the vehicle.

As a specific example, a general-purpose LIDAR system may provide data related to, for instance, a car passing on the vehicle's right. A controller may determine target information based on the data from the general-purpose LIDAR system. Based on the target information, the controller may cause the LIDAR system disclosed herein to scan for the specific passing car and evaluate the target object with higher resolution and/or with a higher pulse repetition rate.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

System Examples

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting. As shown, the vehicle 100 includes five sensor units 102, 104, 106, 108, and 110, and four wheels, exemplified by wheel 112.

In line with the discussion above, each of the sensor units 102, 104, 106, 108, and 110 may include one or more light detection and ranging devices (LIDARs) that may be configured to scan an environment around the vehicle 100 according to various road conditions or scenarios. Additionally or alternatively, in some embodiments, the sensor units 102, 104, 106, 108, and 110 may include any combination of global positioning system sensors, inertial measurement units, radio detection and ranging (RADAR) units, cameras, laser rangefinders, LIDARs, and/or acoustic sensors among other possibilities.

As shown, the sensor unit 102 is mounted to a top side of the vehicle 100 opposite to a bottom side of the vehicle 100 where the wheel 112 is mounted. Further, the sensor units 104, 106, 108, and 110 are each mounted to a given side of the vehicle 100 other than the top side. For example, the sensor unit 104 is positioned at a front side of the vehicle 100, the sensor 106 is positioned at a back side of the vehicle 100, the sensor unit 108 is positioned at a right side of the vehicle 100, and the sensor unit 110 is positioned at a left side of the vehicle 100.

While the sensor units 102, 104, 106, 108, and 110 are shown to be mounted in particular locations on the vehicle 100, in some embodiments, the sensor units 102, 104, 106, 108, and 110 may be mounted elsewhere on the vehicle 100, either inside or outside the vehicle 100. For example, although FIG. 1A shows the sensor unit 108 mounted to a right-side rear-view mirror of the vehicle 100, the sensor unit 108 may alternatively be positioned in another location along the right side of the vehicle 100. Further, while five sensor units are shown, in some embodiments more or fewer sensor units may be included in the vehicle 100.

In some embodiments, one or more of the sensor units 102, 104, 106, 108, and 110 may include one or more movable mounts on which the sensors may be movably mounted. The movable mount may include, for example, a rotating platform. Sensors mounted on the rotating platform could be rotated so that the sensors may obtain information from various directions around the vehicle 100. For example, a LIDAR of the sensor unit 102 may have a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of the sensor units 102, 104, 106, 108, and 110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, the vehicle 100 includes one or more wheels such as the wheel 112 that are configured to rotate to cause the vehicle to travel along a driving surface. In some embodiments, the wheel 112 may include at least one tire coupled to a rim of the wheel 112. To that end, the wheel 112 may include any combination of metal and rubber, or a combination of other materials. The vehicle 100 may include one or more other components in addition to or instead of those shown.

Figure 1B:
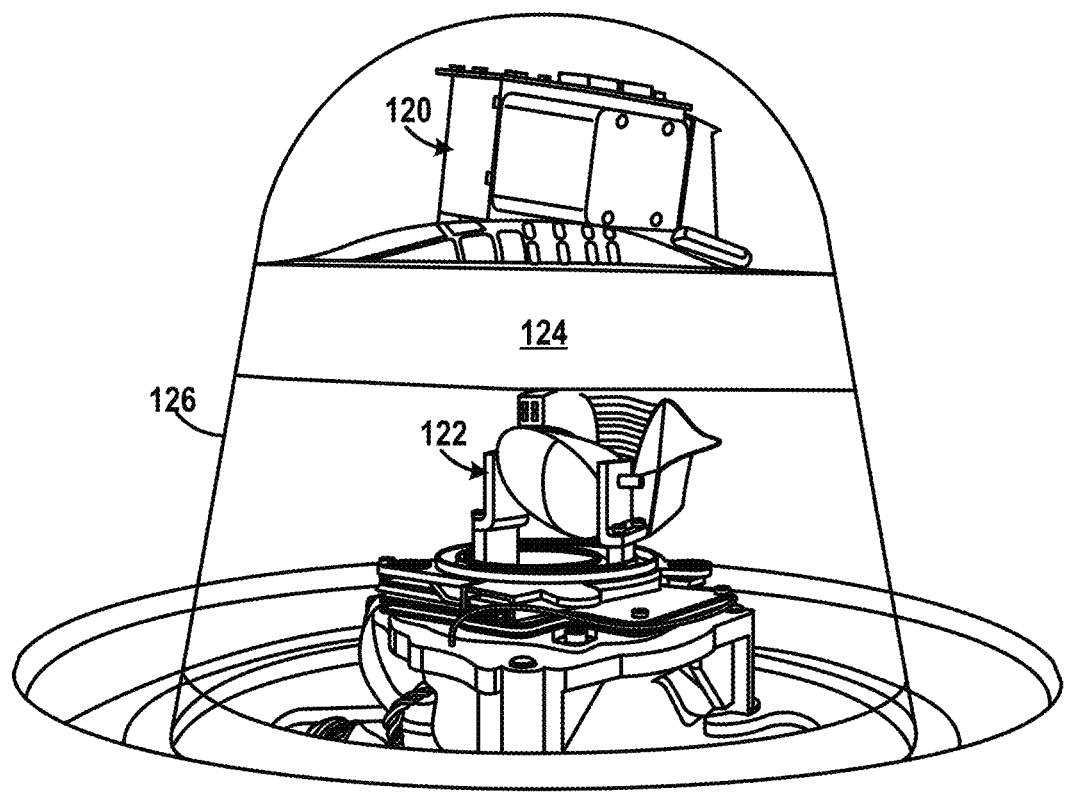
FIG. 1B illustrates a perspective view of a sensor unit, according to an example embodiment.

FIG. 1B is a perspective view of the sensor unit 102 positioned at the top side of the vehicle 100 shown in FIG. 1A. As shown, the sensor unit 102 includes a first LIDAR 120, a second LIDAR 122, a dividing structure 124, and light filter 126.

In some examples, the first LIDAR 120 may be configured to scan an environment around the vehicle 100 by rotating about an axis (e.g., vertical axis, etc.) continuously while emitting one or more light pulses and detecting reflected light pulses off objects in the environment of the vehicle, for example. In some embodiments, the first LIDAR 120 may be configured to repeatedly rotate about the axis to be able to scan the environment at a sufficiently high refresh rate to quickly detect motion of objects in the environment. For instance, the first LIDAR 120 may have a refresh rate of 10 Hz (e.g., ten complete rotations of the first LIDAR 120 per second), thereby scanning a 360-degree FOV around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. In this embodiment, the 3D map may have sufficient resolution to detect or identify objects within a medium range of 100 meters from the vehicle 100, for example. However, other configurations (e.g., number of light sources, angular resolution, wavelength, range, etc.) are possible as well.

Unlike the first LIDAR 120, in some embodiments, the second LIDAR 122 may be configured to scan a narrower FOV of the environment around the vehicle 100. For instance, the second LIDAR 122 may be configured to rotate (horizontally) for less than a complete rotation about a similar axis. Further, in some examples, the second LIDAR 122 may have a lower refresh rate than the first LIDAR 120. Through this process, the vehicle 100 may determine a 3D map of the narrower FOV of the environment using the data from the second LIDAR 122. The 3D map in this case may have a higher angular resolution than the corresponding 3D map determined based on the data from the first LIDAR 120, and may thus allow detection/identification of objects that are further than the medium range of distances of the first LIDAR 120, as well as identification of smaller objects within the medium range of distances. In one embodiment, the second LIDAR 122 may have a FOV of 8° (horizontal)× 15° (vertical), a refresh rate of 4 Hz, and may emit one narrow beam having a wavelength of 1550 nm. In this embodiment, the 3D map determined based on the data from the second LIDAR 122 may have an angular resolution of 0.1° (horizontal)×0.03° (vertical), thereby allowing detection/identification of objects within a range of around three hundred meters from the vehicle 100. However, other configurations (e.g., number of light sources, angular resolution, wavelength, range, etc.) are possible as well.

In some examples, the vehicle 100 may be configured to adjust a viewing direction of the second LIDAR 122. For example, while the second LIDAR 122 has a narrow horizontal FOV (e.g., 8 degrees), the second LIDAR 122 may be mounted to a stepper motor (not shown) that allows adjusting the viewing direction of the second LIDAR 122 to pointing directions other than that shown in FIG. 1B. Thus, in some examples, the second LIDAR 122 may be steerable to scan the narrow FOV along any pointing direction from the vehicle 100.

The structure, operation, and functionality of the second LIDAR 122 are described in greater detail within exemplary embodiments herein.

The dividing structure 124 may be formed from any solid material suitable for supporting the first LIDAR 120 and/or optically isolating the first LIDAR 120 from the second LIDAR 122. Example materials may include metals, plastics, foam, among other possibilities.

The light filter 126 may be formed from any material that is substantially transparent to light having wavelengths with a wavelength range, and substantially opaque to light having wavelengths outside the wavelength range. For example, the light filter 126 may allow light having the first wavelength of the first LIDAR 120 (e.g., 905 nm) and the second wavelength of the second LIDAR 122 (e.g., 1550 nm) to propagate through the light filter 126. As shown, the light filter 126 is shaped to enclose the first LIDAR 120 and the second LIDAR 122. Thus, in some examples, the light filter 126 may also be configured to prevent environmental damage to the first LIDAR 120 and the second LIDAR 122, such as accumulation of dust or collision with airborne debris, among other possibilities. In some examples, the light filter 126 may be configured to reduce visible light propagating through the light filter 126. In turn, the light filter 126 may improve an aesthetic appearance of the vehicle 100 by enclosing the first LIDAR 120 and the second LIDAR 122, while reducing visibility of the components of the sensor unit 102 from a perspective of an outside observer, for example. In other examples, the light filter 126 may be configured to allow visible light as well as the light from the first LIDAR 120 and the second LIDAR 122.

In some embodiments, portions of the light filter 126 may be configured to allow different wavelength ranges to propagate through the light filter 126. For example, an upper portion of the light filter 126 above the dividing structure 124 may be configured to allow propagation of light within a first wavelength range that includes the first wavelength of the first LIDAR 120. Further, for example, a lower portion of the light filter 126 below the dividing structure 124 may be configured to allow propagation of light within a second wavelength range that includes the second wavelength of the second LIDAR 122. In other embodiments, the wavelength range associated with the light filter 126 may include both the first wavelength of the first LIDAR 120 and the second wavelength of the second LIDAR 122.

Figure 1C:
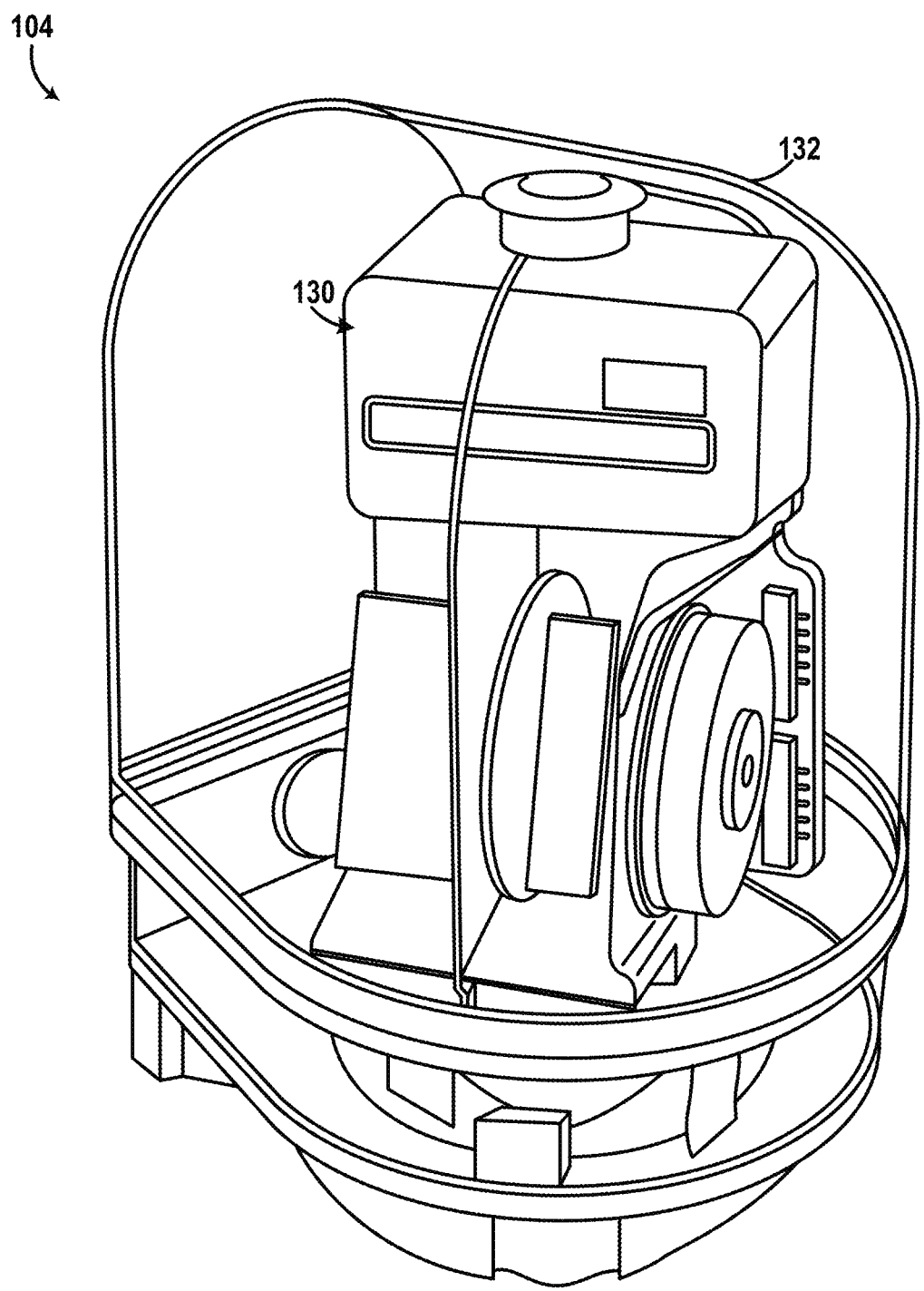
FIG. 1C illustrates a perspective view of a sensor unit, according to an example embodiment.

FIG. 1C is a perspective view of the sensor unit 104 positioned at the front side of the vehicle 100 shown in FIG. 1A. In some examples, the sensor units 106, 108, and 110 may be configured similarly to the sensor unit 104 illustrated in FIG. 1C. As shown, the sensor unit 104 includes a third LIDAR 130 and a light filter 132.

The third LIDAR 130 may be configured to scan a FOV of the environment around the vehicle 100 that extends away from a given side of the vehicle 100 (i.e., the front side) where the third LIDAR 130 is positioned. Thus, in some examples, the third LIDAR 130 may be configured to rotate (e.g., horizontally) across a wider FOV than the second LIDAR 122 but less than the 360-degree FOV of the first LIDAR 120 due to the positioning of the third LIDAR 130. In one embodiment, the third LIDAR 130 may have a FOV of 270° (horizontal)×110° (vertical), a refresh rate of 4 Hz, and may emit one laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a short range of 30 meters to the vehicle 100. However, other configurations (e.g., number of light sources, angular resolution, wavelength, range, etc.) are possible as well. The structure, operation, and functionality of the third LIDAR 130 are described in greater detail within exemplary embodiments of the present disclosure.

The light filter 132 may be similar to the light filter 126 of FIG. 1B. For example, the light filter 132 may be shaped to enclose the third LIDAR 130. Further, for example, the light filter 132 may be configured to allow light within a wavelength range that includes the wavelength of light from the third LIDAR 130 to propagate through the light filter 132. In some examples, the light filter 132 may be configured to reduce visible light propagating through the light filter 132, thereby improving an aesthetic appearance of the vehicle 100.

Figure 1D:
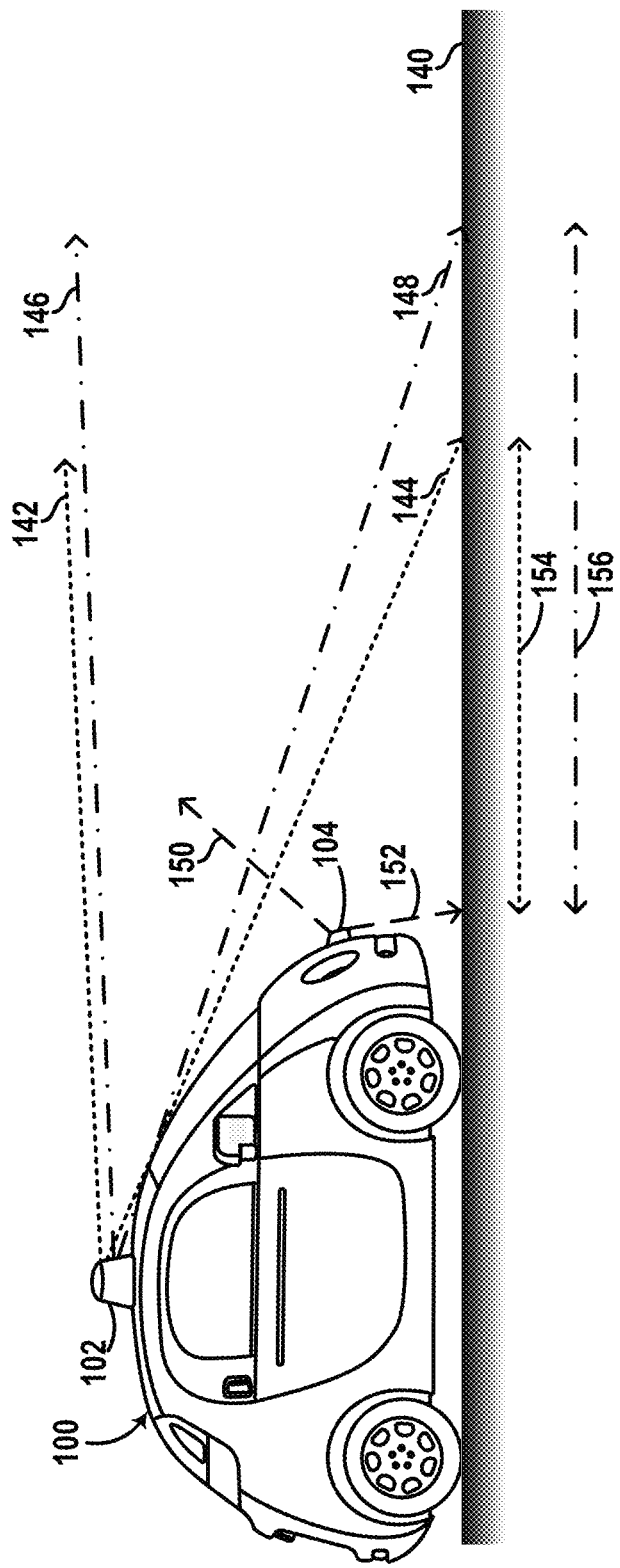
FIG. 1D illustrates a scanning environment around a vehicle, according to an example embodiment.

FIG. 1D illustrates a scenario where the vehicle 100 is operating on a surface 140. The surface 140, for example, may be a driving surface such as a road or a highway, or any other surface. In FIG. 1D, the arrows 142, 144, 146, 148, 150, 152 illustrate light pulses emitted by various LIDARs of the sensor units 102 and 104 at ends of the vertical FOV of the respective LIDAR.

By way of example, arrows 142 and 144 illustrate light pulses emitted by the first LIDAR 120 of FIG. 1B. In this example, the first LIDAR 120 may emit a series of pulses in the region of the environment between the arrows 142 and 144 and may receive reflected light pulses from that region to detect and/or identify objects in that region. Due to the positioning of the first LIDAR 120 (not shown) of the sensor unit 102 at the top side of the vehicle 100, the vertical FOV of the first LIDAR 120 is limited by the structure of the vehicle 100 (e.g., roof, etc.) as illustrated in FIG. 1D. However, the positioning of the first LIDAR 120 in the sensor unit 102 at the top side of the vehicle 100 allows the first LIDAR 120 to scan all directions around the vehicle 100 by rotating about a substantially vertical axis 170. Similarly, for example, the arrows 146 and 148 illustrate light pulses emitted by the second LIDAR 122 of FIG. 1B at the ends of the vertical FOV of the second LIDAR 122. Further, the second LIDAR 122 may also be steerable to adjust a viewing direction of the second LIDAR 122 to any direction around the vehicle 100 in line with the discussion. In one embodiment, the vertical FOV of the first LIDAR 120 (e.g., angle between arrows 142 and 144) is 20° and the vertical FOV of the second LIDAR 122 is 15° (e.g., angle between arrows 146 and 148). However, other vertical FOVs are possible as well depending, for example, on factors such as structure of the vehicle 100 or configuration of the respective LIDARs.

As shown in FIG. 1D, the sensor unit 102 (including the first LIDAR 120 and/or the second LIDAR 122) may scan for objects in the environment of the vehicle 100 in any direction around the vehicle 100 (e.g., by rotating, etc.), but may be less suitable for scanning the environment for objects in close proximity to the vehicle 100. For example, as shown, objects within distance 154 to the vehicle 100 may be undetected or may only be partially detected by the first LIDAR 120 of the sensor unit 102 due to positions of such objects being outside the region between the light pulses illustrated by the arrows 142 and 144. Similarly, objects within distance 156 may also be undetected or may only be partially detected by the second LIDAR 122 of the sensor unit 102.

Accordingly, the third LIDAR 130 (not shown) of the sensor unit 104 may be used for scanning the environment for objects that are close to the vehicle 100. For example, due to the positioning of the sensor unit 104 at the front side of the vehicle 100, the third LIDAR 130 may be suitable for scanning the environment for objects within the distance 154 and/or the distance 156 to the vehicle 100, at least for the portion of the environment extending away from the front side of the vehicle 100. As shown, for example, the arrows 150 and 152 illustrate light pulses emitted by the third LIDAR 130 at ends of the vertical FOV of the third LIDAR 130. Thus, for example, the third LIDAR 130 of the sensor unit 104 may be configured to scan a portion of the environment between the arrows 150 and 152, including objects that are close to the vehicle 100. In one embodiment, the vertical FOV of the third LIDAR 130 is 110° (e.g., angle between arrows 150 and 152). However, other vertical FOVs are possible as well.

It is noted that the angles between the various arrows 142-152 shown in FIG. 1D are not to scale and are for illustrative purposes only. Thus, in some examples, the vertical FOVs of the various LIDARs may vary as well.

Figure 1E:
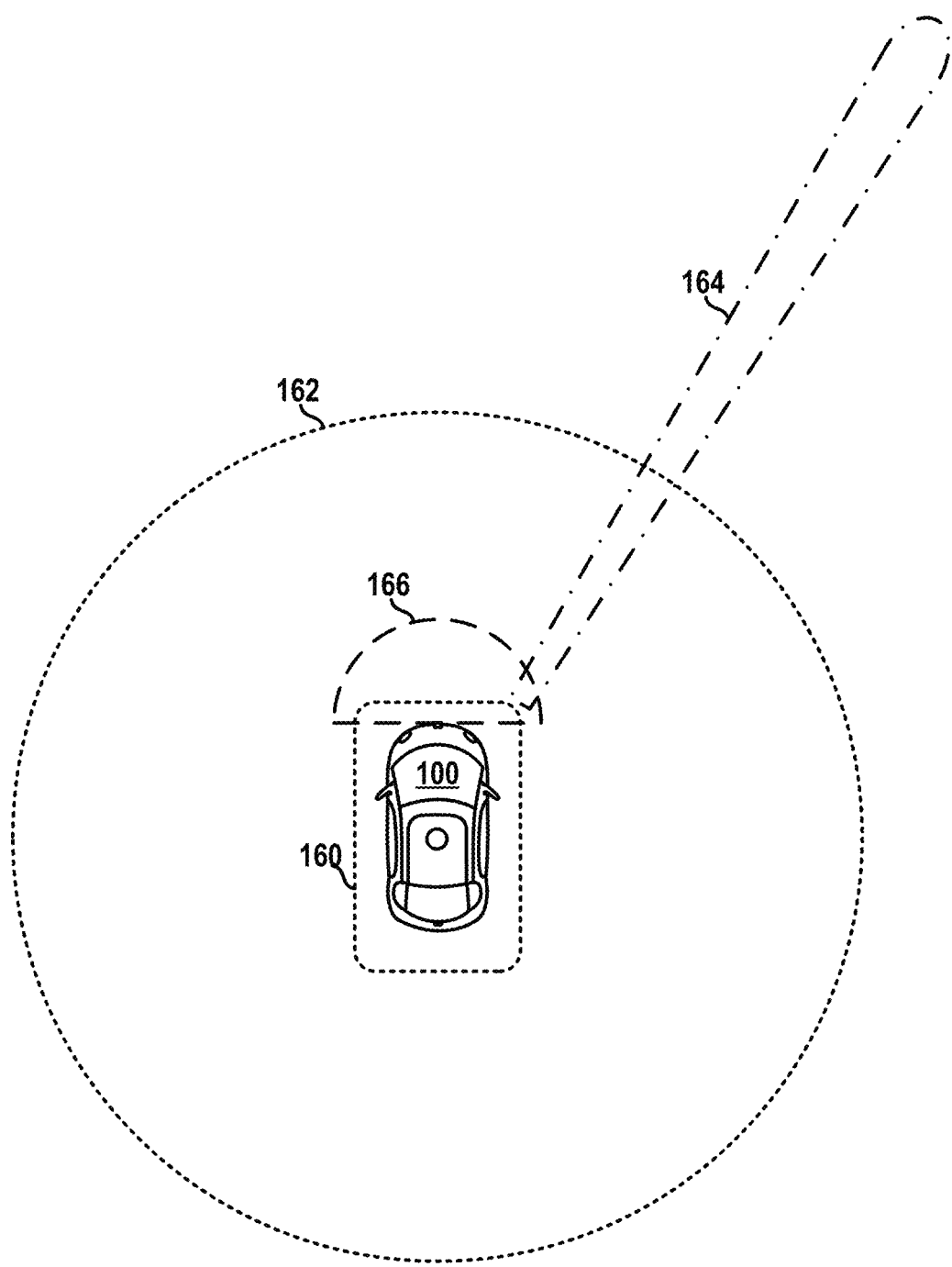
FIG. 1E illustrates a scanning environment around a vehicle, according to an example embodiment.

FIG. 1E illustrates a top view of the vehicle 100 in a scenario where the vehicle 100 is scanning a surrounding environment. In line with the discussion above, each of the various LIDARs of the vehicle 100 may have a particular resolution according to its respective refresh rate, FOV, or any other factor. In turn, the various LIDARs may be suitable for detection and/or identification of objects within a respective range of distances to the vehicle 100.

As shown in FIG. 1E, contours 160 and 162 illustrate an example range of distances to the vehicle 100 where objects may be detected/identified based on data from the first LIDAR 120 of the sensor unit 102. As illustrated, for example, close objects within the contour 160 may not be properly detected and/or identified due to the positioning of the sensor unit 102 on the top side of the vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

Further, as shown in FIG. 1E, contour 164 illustrates a region of the environment where objects may be detected and/or identified using the higher resolution data from the second LIDAR 122 of the sensor unit 102. As shown, the contour 164 includes objects further away from the vehicle 100 over a relatively longer range of distances (e.g., 300 meters, etc.), for example. Although the contour 164 indicates a narrower FOV (horizontally) of the second LIDAR 122, in some examples, the vehicle 100 may be configured to adjust the viewing direction of the second LIDAR 122 to any other direction than that shown in FIG. 1E. By way of example, the vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1E, contour 166 illustrates a region of the environment scanned by the third LIDAR 130 of the sensor unit 104. As shown, the region illustrated by the contour 166 includes portions of the environment that may not be scanned by the first LIDAR 120 and/or the second LIDAR 124, for example. Further, for example, the data from the third LIDAR 130 has a resolution sufficient to detect and/or identify objects within a short distance (e.g., 30 meters, etc.) to the vehicle 100.

It is noted that the ranges, resolutions, and FOVs described above are for exemplary purposes only, and may vary according to various configurations of the vehicle 100. Further, the contours 160, 162, 164, and 166 shown in FIG. 1E are not to scale but are illustrated as shown for convenience of description.

Figure 2:
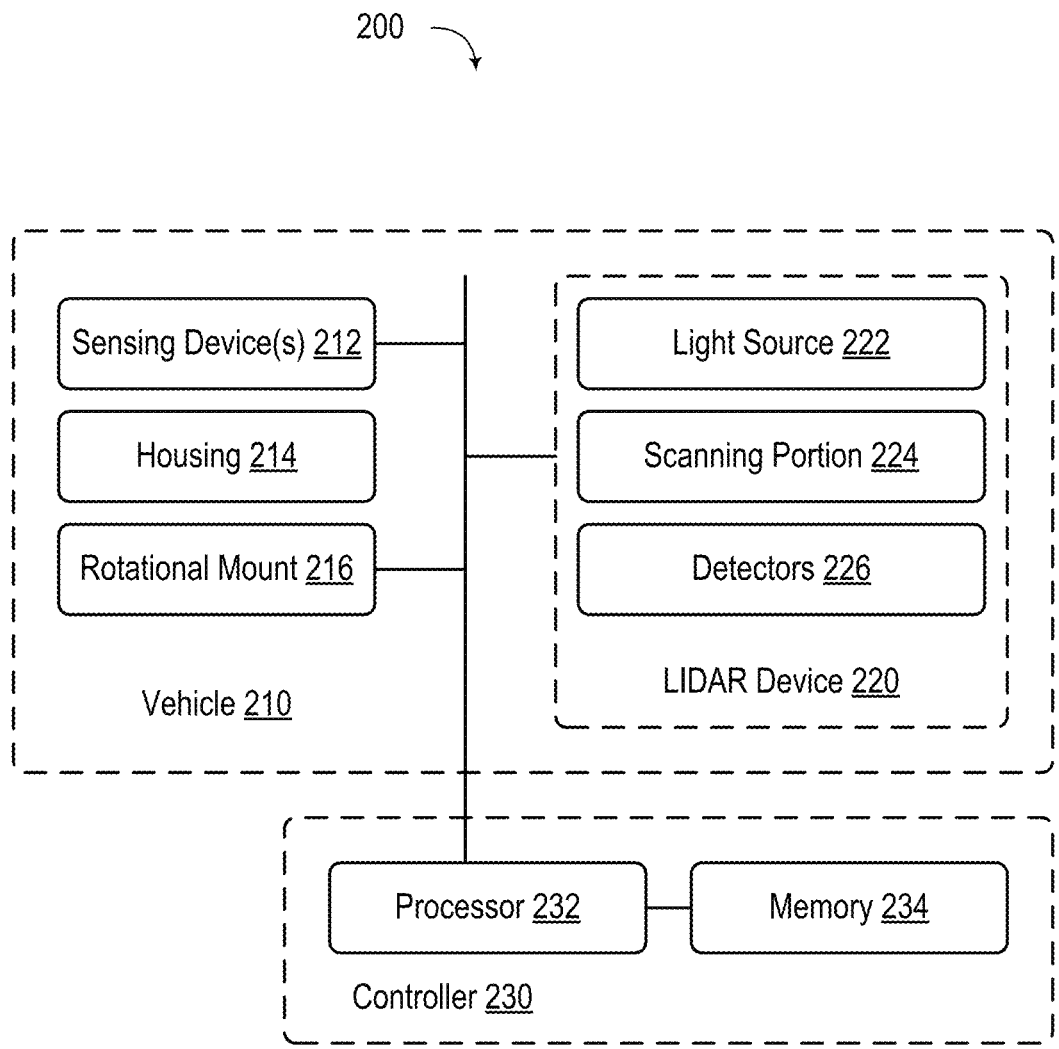
FIG. 2 illustrates a system, according to an example embodiment.

FIG. 2 illustrates a system 200 that may include a vehicle 210 and a controller 230. The vehicle 210 could be similar or identical to vehicle 100 illustrated and described in reference to FIG. 1. The system 200 may include one or more sensing devices 212, a housing 214, a rotational mount 216, and a LIDAR device 220. The controller 230 may include a processor 232 and a memory 234.

The sensing device 212 may be configured to provide environmental data about an environment around the vehicle 210. The sensing device 212 may be coupled to the vehicle, however locations of the sensing device 212 remote to the vehicle are possible. The sensing device 212 may include a camera, a LIDAR device, a RADAR device, a sonar transducer, or another type of sensor.

LIDAR device 220 may be configured to rotate about an axis that passes from top to bottom through the vehicle. As such, the LIDAR device 220 may be configured to emit laser light into the environment around the vehicle and receive reflected light back from objects in the environment. By analyzing the received light, a point cloud may be formed that could provide a three-dimensional (3D) representation of the environment. In other words, the LIDAR device 220 may be able to provide information about a 360-degree field of view around the vehicle.

The LIDAR device 220 may be similar or identical to the second LIDAR device 124 as described and illustrated in reference to FIG. 1 above. The LIDAR device 220 may be coupled to the vehicle 210. The LIDAR device 220 includes a light source 222, which may be configured to emit light at one or more wavelengths. In an example embodiment, the LIDAR device 220 may be configured to emit light at a 1550 nm wavelength. Other emission wavelengths are possible. The light source 222 of the LIDAR device 220 may be a fiber laser, such as a laser that includes an optical fiber doped with rare-earth elements that may serve as an active gain medium. Alternatively, the light source 222 could be another type of laser.

In an example embodiment, a scanning portion 224 of the LIDAR device 220 may be configured to direct the emitted light in a reciprocating manner about a first axis. In an example embodiment, the scanning portion 224 may include a moveable mirror, a spring, and an actuator. The light source 222 of the LIDAR device 220 may emit light toward the moveable mirror. The spring and the actuator may be configured to move the moveable mirror in a reciprocating manner about a horizontal axis so as to move a beam of emitted light in along a substantially vertical line.

In some embodiments, the spring and the actuator may be configured to move the moveable mirror about the first axis at a resonant frequency. The resonant frequency could be 140 Hz, but other frequencies are possible.

Furthermore, at least the moveable mirror may be mounted on the rotational mount 216. In an example embodiment, the scanning portion 224 of the LIDAR device 220 may be disposed within a housing 214. The housing 214 may be positioned at a top side of the vehicle 210. In such a scenario, a second axis may be defined as passing through the top and the bottom of the vehicle 210. As described above, the rotational mount 216 may be coupled to the moveable mirror, such that the moveable mirror may rotate about the second axis. Accordingly, the moveable mirror may be configured to direct light within a 360-degree field of view around the vehicle 210. In other example embodiments, the rotational mount 216 need not be configured to rotate 360 degrees, but rather within a smaller angle range.

The housing 214 may include a light filter. The light filter may be dome-shaped and may be configured to reduce an amount of visible light propagating through the light filter.

The LIDAR device 220 may further include one or more detectors 226 configured to receive the reflected emission light from the environment. In an example embodiment, the LIDAR device 220 may be configured to form a 3D representation based on the environmental information. Furthermore, the LIDAR device 220 may be configured to determine objects in the environment based on the 3D representation.

LIDAR device 220 may be configured to operate in response to environmental information provided by the other sensing devices 212. For instance, the other sensing devices 212 may obtain environmental information that may indicate an object in the environment of the vehicle. Target information may be determined based on the environmental information. Namely, the target information may include a type, size, or shape of an object, a particular distance, a particular position, or an angle range. In some embodiments, the target information may be indicative of a target object about which higher quality information is requested, e.g. higher resolution, further number of scans, etc. For example, if another sensing device 212 provides environmental information that indicates a possible pedestrian near a crosswalk, target information may be based on a location of the possible pedestrian.

Figure 3A:
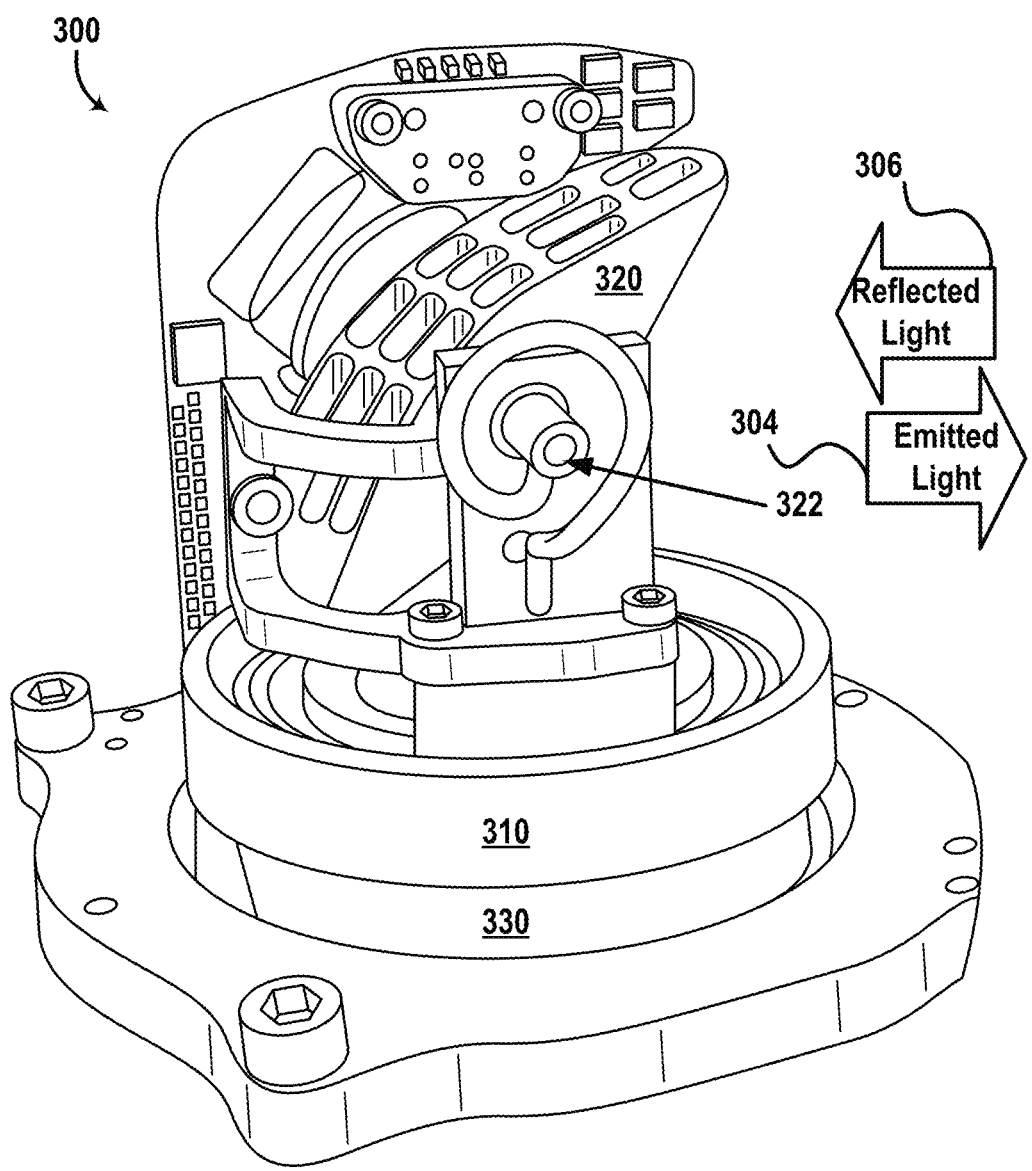
FIG. 3A illustrates a view of a LIDAR device, according to an example embodiment.

FIG. 3A illustrates a view of a LIDAR device 300, according to an example embodiment. The LIDAR device 300 may be similar or identical to the second LIDAR 122 as illustrated and described in reference to FIG. 1B. For example, the LIDAR device 300 may be mounted at a top side of a vehicle such as the vehicle 100 similarly to the second LIDAR 122 of the FIG. 1B. As shown, the LIDAR device 300 includes an optics assembly 310, a mirror 320, a pin 322, and a platform 330. Additionally, light beams 304 emitted by the second LIDAR device 300 propagate away from the mirror 320 along a viewing direction of the second LIDAR 300 toward an environment of the LIDAR device 300, and reflect of one or more objects in the environment as reflected light 306.

The optics assembly 310 may be configured to emit light pulses towards the mirror 320 that are then reflected by the mirror 320 as the emitted light 304. Further, the optics assembly 310 may be configured to receive reflected light 306 that is reflected off the mirror 320. In one embodiment, the optics assembly 310 may include a single laser emitter that is configured to provide a narrow beam having a wavelength of 1550 nm. In this embodiment, the narrow beam may have a high energy sufficient for detection of objects within a long range of distances, similarly to the second LIDAR 122 of FIG. 1B. In other embodiments, the optics assembly 310 may include multiple light sources similarly to the LIDAR 200 of FIGS. 2A-2B. Further, in some examples, the optics assembly 310 may include a single lens for both collimation of emitted light 304 and focusing of reflected light 306. In other examples, the optics assembly 310 may include a first lens for collimation of emitted light 304 and a second lens for focusing of reflected light 306.

The mirror 320 may be arranged to steer emitted light 304 from the optics assembly 310 towards the viewing direction of the LIDAR 300 as illustrated in FIG. 3A. Similarly, for example, the mirror 320 may be arranged to steer reflected light 306 from the environment towards the optics assembly 310.

The pin 322 may be configured to mount the mirror 320 to the LIDAR device 300. In turn, the pin 322 can be formed from any material capable of supporting the mirror 320. For example, the pin 322 may be formed from a solid material such as plastic or metal among other possibilities. In some examples, the LIDAR 300 may be configured to rotate the mirror 320 about the pin 322 over a given range of angles to steer the emitted light 304 vertically. In one embodiment, the LIDAR 300 may rotate the mirror 320 about the pin 322 over the range of angles of 15°. In this embodiment, the vertical FOV of the LIDAR 300 may correspond to 15°. However, other vertical FOVs are possible as well according to various factors such as the mounting position of the LIDAR 300 or any other factor.

The platform 330 can be formed from any material capable of supporting various components of the LIDAR 300 such as the optics assembly 310 and the mirror 320. For example, the platform 330 may be formed from a solid material such as plastic or metal among other possibilities. In some examples, the platform 330 may be configured to rotate about an axis of the LIDAR device 300. For example, the platform 330 may include a motor such as a stepper motor to facilitate such rotation. In some examples, the axis is substantially vertical. By rotating the platform 330 that supports the various components, in some examples, the platform 330 may steer the emitted light 304 horizontally, thus allowing the LIDAR 300 to have a horizontal FOV. In one embodiment, the platform 330 may rotate for a defined amount of rotation such as 8°. In this embodiment, the LIDAR 300 may thus have a horizontal FOV of 8°, similarly to the second LIDAR 122 of FIG. 1B. In another embodiment, the platform 330 may rotate for complete 360° rotation such that the horizontal FOV is 360°, similarly to the first LIDAR 120 of FIG. 1B. Other configurations of the platform 330 are possible as well.

Figure 3B:
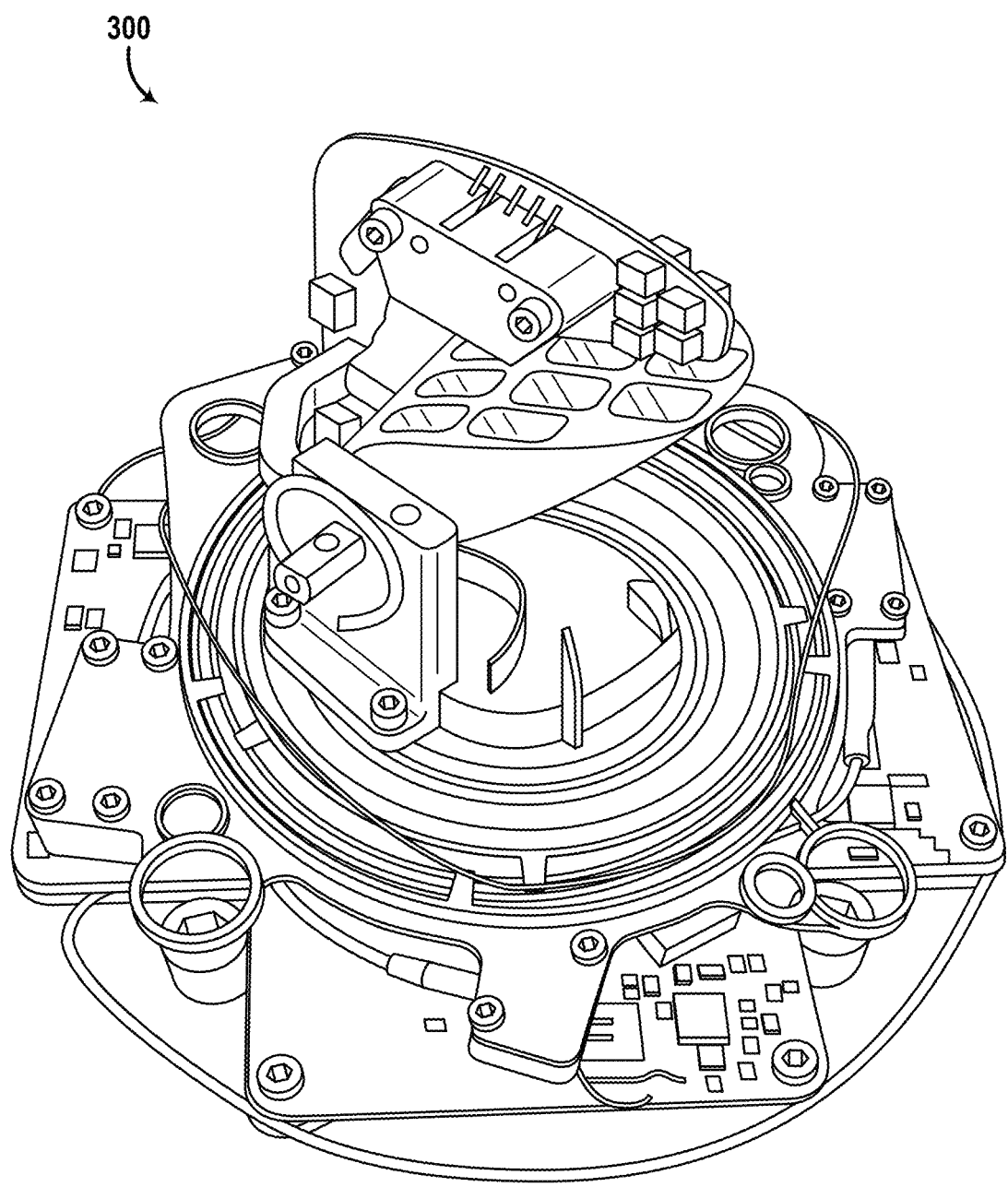
FIG. 3B illustrates a view of a LIDAR device, according to an example embodiment.

FIG. 3B illustrates a view of a LIDAR device 300, according to an example embodiment. Namely, FIG. 3B is an overhead oblique view of the LIDAR device 300.

Figure 4A:
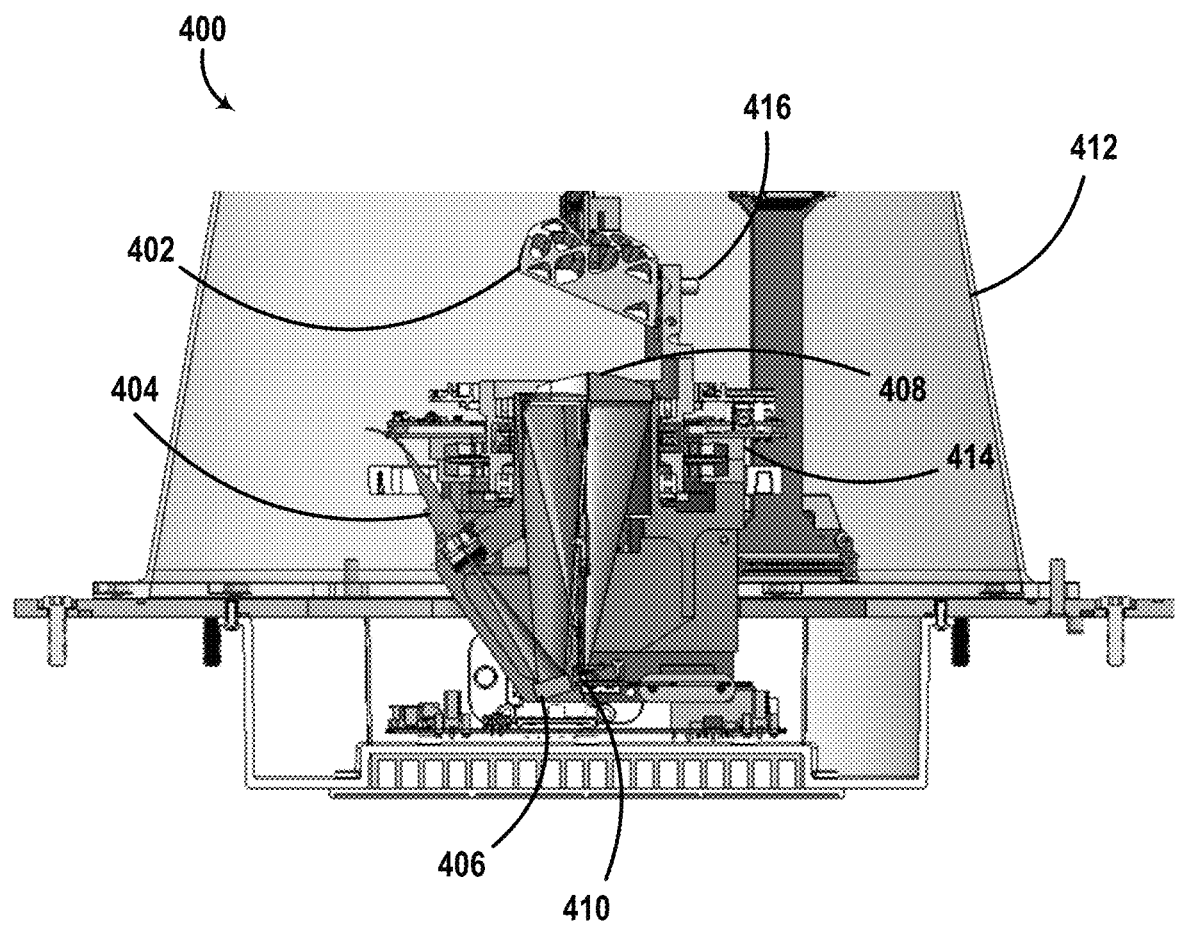
FIG. 4A illustrates a cross-sectional view of a LIDAR device, according to an example embodiment.
Figure 4B:
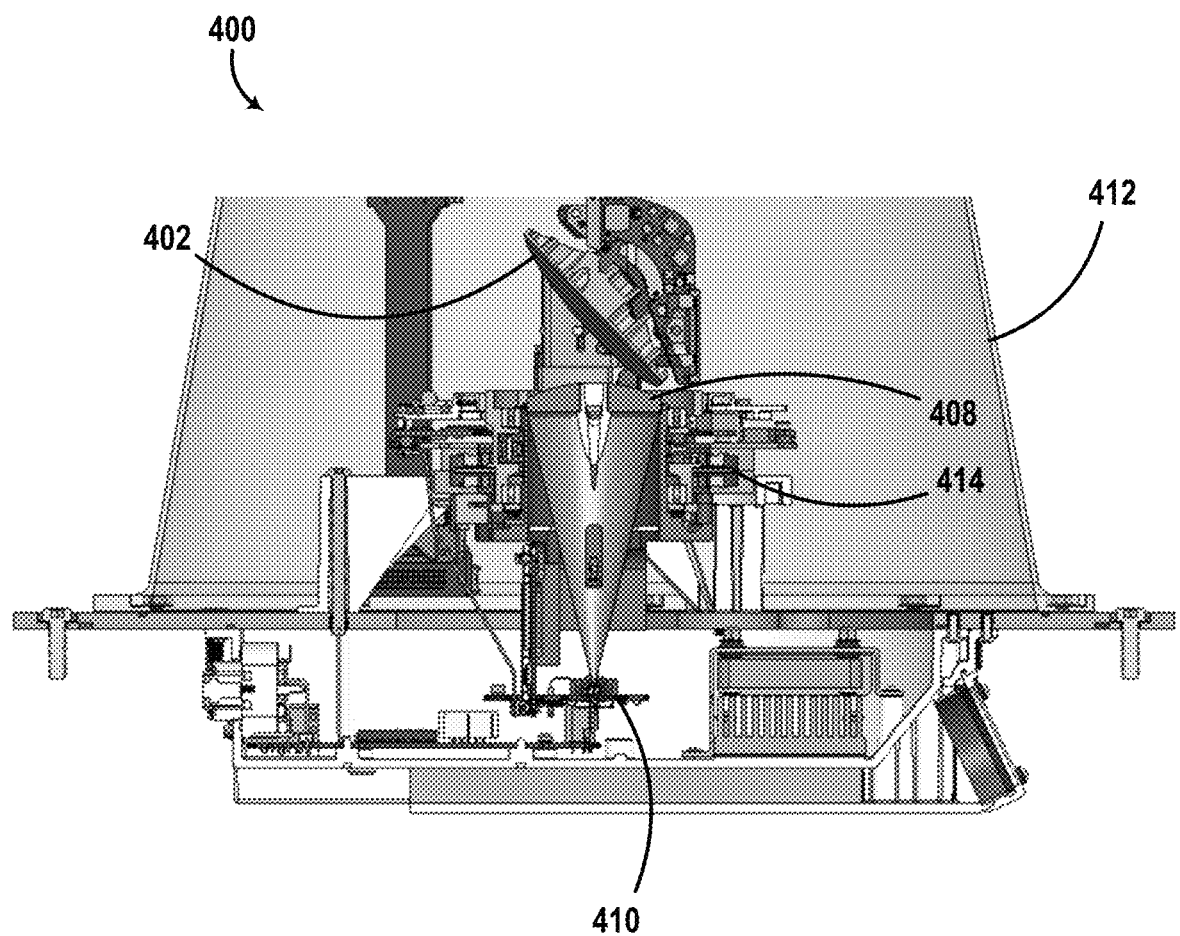
FIG. 4B illustrates a cross-sectional view of a LIDAR device, according to an example embodiment.

FIGS. 4A and 4B illustrate different cross-sectional views of a LIDAR device 400, according to an example embodiment. The LIDAR device 400 may be similar or identical to other devices disclosed herein, such as LIDAR device 200 and LIDAR device 300 as illustrated and described in reference to FIGS. 2, 3A, and 3B. Furthermore, LIDAR device 400 may be one of a plurality of LIDAR sensor devices incorporated into a vehicle such as vehicle 100 illustrated and described in reference to FIGS. 1A and 1B.

The LIDAR device 400 may include a moveable mirror 402, a light source 404, an emission mirror 406, a lens 408, and one or more detectors 410. The LIDAR device 400 may be enclosed by a light filter 412.

As described elsewhere herein, the light source 404 may be a fiber laser. The light source 404 may emit emission light at 1550 nm. The emission light from the light source 404 may be reflected off the emission mirror 406. The emission mirror 406 may be a flat mirror. Alternatively or additionally, the emission mirror 406 may include a converging mirror, a diverging mirror, or another type of reflective optic device, e.g. cylindrical lens. One of skill in the art will recognize that the emission mirror 406 may represent one or more optical components configured to direct emission light towards the moveable mirror 402. Furthermore, the one or more optical components may be configured to shape, reflect, focus, or otherwise modify the emission light from the light source 404.

The emission light may optionally be focused by lens 408 before interacting with the moveable mirror 402. Alternatively, the emission light may pass through an opening (e.g. a pass-through slit or aperture) in the lens 408 before interacting with the moveable mirror 402. Additionally or alternatively, the emission light may be focused or otherwise modified by another optical element.

The light filter 412 may be configured to be substantially transparent to at least some wavelengths of emission light. The light filter 412 may be configured to be substantially opaque to other wavelengths of light.

As described elsewhere herein, the LIDAR device 400 may be configured to rotate on a rotational mount 414. Specifically, rotational mount 414 may be configured to rotate about a vertical axis. The moveable mirror 402 may be configured to rotate about pin 416 in a reciprocating manner, so as to direct emission light upwards and downwards along a vertical plane. The combination of the rotational motion via rotational mount 414 and the reciprocating motion of the movable mirror 402 may enable the illumination of a field of view of an environment of a vehicle.

Emission light may interact with objects and surfaces in the vehicle's environment. At least a portion of the emission light may be reflected back towards the LIDAR device 400 and the moveable mirror 402 as reflected light. The reflected light may interact with the moveable mirror 402 such that the moveable mirror 402 directs the reflected light towards lens 408. Lens 408 may focus, collimate, or otherwise modify the reflected light such that it interacts with the one or more detectors 410.

As described elsewhere herein, the reflected light collected by the one or more detectors 410 may be used to form a spatial point cloud. The spatial point cloud may provide information about objects and/or surfaces in the field of view of the LIDAR device 400.

Figure 5:
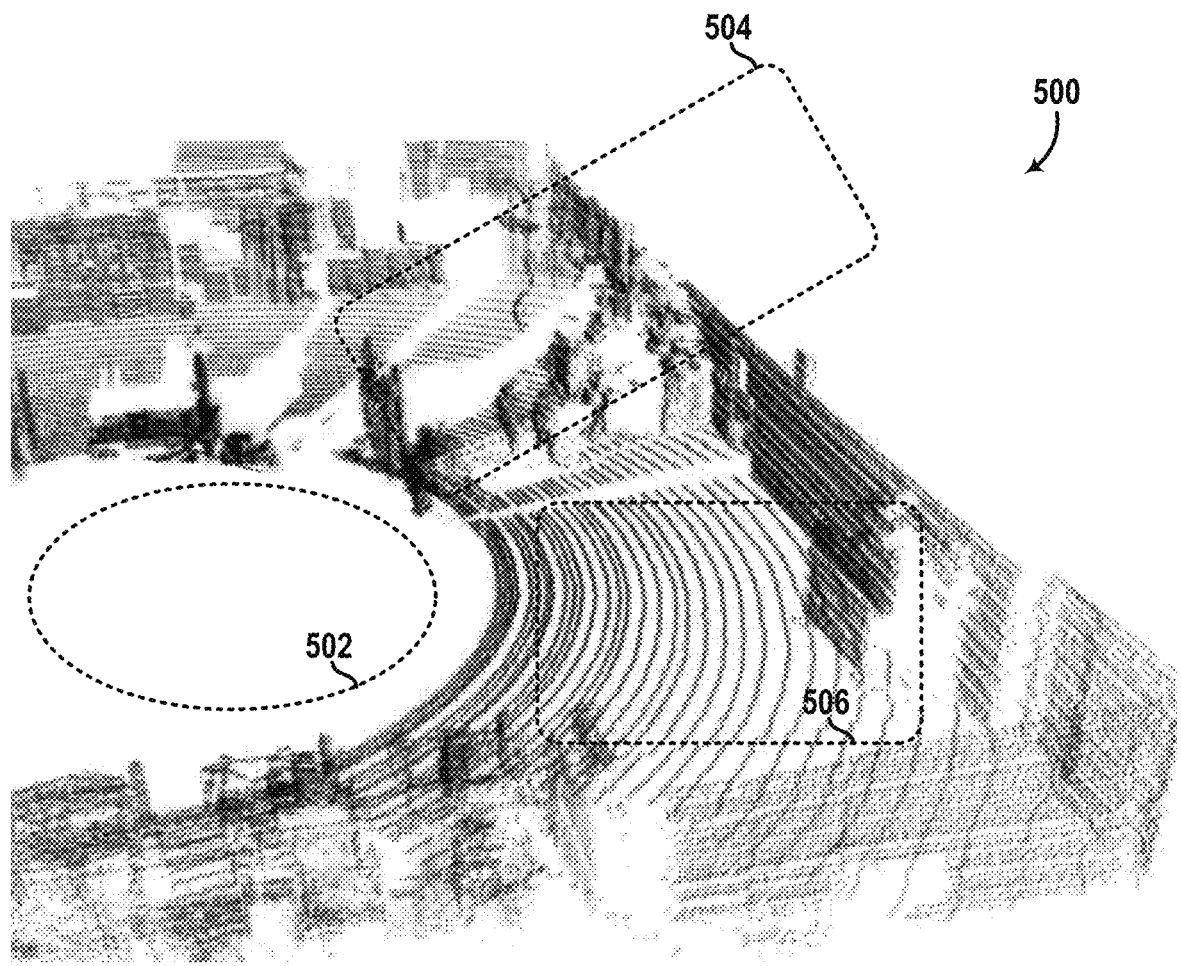
FIG. 5 illustrates a representation of a scene, according to an example embodiment.

FIG. 5 illustrates a representation of a scene 500, according to an example embodiment. Specifically, FIG. 5 may illustrate a spatial point cloud of an environment based on data from the LIDAR device 300 and 400 of FIGS. 3A, 3B, 4A, and 4B. The spatial point cloud may represent a three-dimensional (3D) representation of the environment around a vehicle. The 3D representation may be generated by a computing device as a 3D point cloud based on the data from the LIDAR device 300 and 400 of FIGS. 3A, 3B, 4A, and 4B. Each point of the 3D cloud, for example, may be associated with a reflected light pulse from the reflected light beams 306 shown in FIG. 3A. Thus, as shown, points at a greater distance from the LIDAR device 300 are further from one another due to the angular resolution of the LIDAR device 300.

Based on the rotation of the LIDAR device 300, the scene 500 includes a scan of the environment in all directions (360° horizontally) as shown in FIG. 5. Further, as shown, a region 502 of the scene 500 does not include any points. For example, the region 502 may correspond to the contour 160 (FIG. 1E) around the vehicle 100 that the LIDAR device 300 of FIG. 3A is unable to scan due to positioning at the top side of the vehicle 100. Further, as shown, a region 504 is indicative of objects in the environment of the LIDAR device 300. For example, the objects in the region 504 may correspond to pedestrians, vehicles, or other obstacles in the environment of the LIDAR device 300. In an example scenario where the LIDAR device 300 is mounted to a vehicle such as the vehicle 100, the vehicle 100 may utilize the spatial point cloud information from the scene 500 to navigate the vehicle away from region 504 towards region 506 that does not include the obstacles of the region 504.

Figure 6:
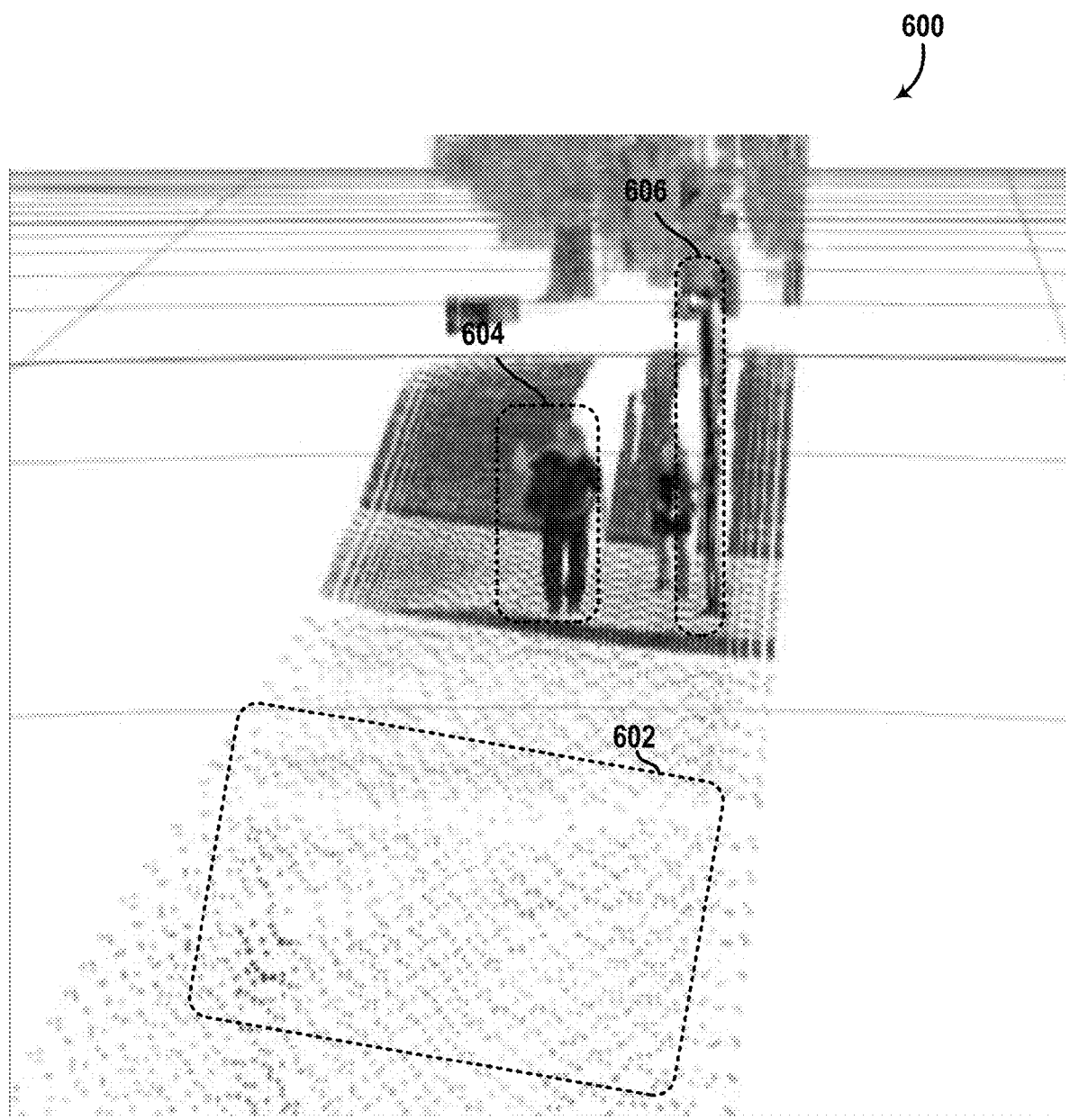
FIG. 6 illustrates a representation of a scene, according to an example embodiment.

FIG. 6 illustrates a representation of a scene 600, according to an example embodiment. In some examples, a 3D representation may be generated based on spatial point cloud data generated by LIDAR device 300 or 400 of FIGS. 3A, 3B, 4A, and 4B. Each point of the 3D cloud, for example, may be associated with a reflected light pulse from the reflected light beams 306 shown in FIG. 3A.

As shown, the representation of the scene 600 includes a region 602 similar to the region 502 of scene 500 that may represent an unscanned or unscannable region due to the positioning of the LIDAR device 300 at the top side of a vehicle. For example, the region 602 may correspond to the contour 160 of FIG. 1E around the vehicle 100.

Unlike the representation of the scene 500 of FIG. 5, however, the representation of the scene 600 may span a much narrower field-of-view. For example, the FOV scanned by the LIDAR 300 and illustrated in the representation of the scene 600 may correspond to the contour 164 of FIG. 1E. Due in part to the narrower FOV, the representation of the scene 600 has a higher resolution than the representation of the scene 500. For instance, points in the point cloud of scene 600 are closer to one another and thus some objects in the environment may be more easily identified compared to the objects in the environment represented by scene 500.

In an example scenario, a vehicle such as the vehicle 100 may include a first LIDAR (e.g., first LIDAR 120) and a second LIDAR (e.g., second LIDAR 122). In the scenario, the vehicle may utilize data from the first LIDAR to generate the representation of scene 500 of FIG. 5. Further, in the scenario, the vehicle may determine that the region 504 of the representation of scene 500 as a region of interest, or a target object/location, for further scanning. In turn, the vehicle in the scenario may adjust a viewing direction of the second LIDAR to scan the region of interest and obtain the representation of scene 600 of FIG. 6. In the scenario, the vehicle may process the representation of scene 600 using a computing process such as an image processing algorithm or a shape detection algorithm. In turn, the vehicle of the scenario may identify an object in region 604 of the representation of scene 600 as a pedestrian, and another object in region 606 as a light post. In the scenario, the vehicle may then navigate accordingly.

In one instance, the vehicle may navigate to be within a first threshold distance to the objects if the objects include a pedestrian (e.g., as indicated by region 604), or a lower second threshold distance if the objects include inanimate objects such as the light post (e.g., indicated by region 606) among other possibilities. In another instance, the vehicle may assign the second LIDAR to track the objects if an animate object is identified (e.g., region 604), or may assign the second LIDAR to track other objects if only inanimate objects were identified. Other navigational operations are possible in line with the scenario.

In an example embodiment, the region of interest or target object/location may be determined based on target information. The target information may include a specific object of interest, a pedestrian, another vehicle, an intersection, a traffic signal, a crosswalk, a "blind" spot of a vehicle, or any number of other targets that may be of interest in navigating a vehicle. The target information may be received by a controller of the LIDAR system and may be provided by a sensing device. The sensing device could include another LIDAR system or it could be another type of sensor, such as a camera, an ultrasonic transducer, and/or a RADAR.

Alternatively or additionally, target information may be based on a map of the environment around the vehicle, a location of the vehicle, or a movement of the vehicle. Other target information is possible to assist in vehicle navigation and object avoidance.

Thus, in some examples, a vehicle that includes a combination of sensors and the LIDAR device disclosed herein may utilize the respective characteristics of each sensor such as refresh rate, resolution, FOV, position, etc., to scan the environment according to various road conditions and/or scenarios.

Figure 7:
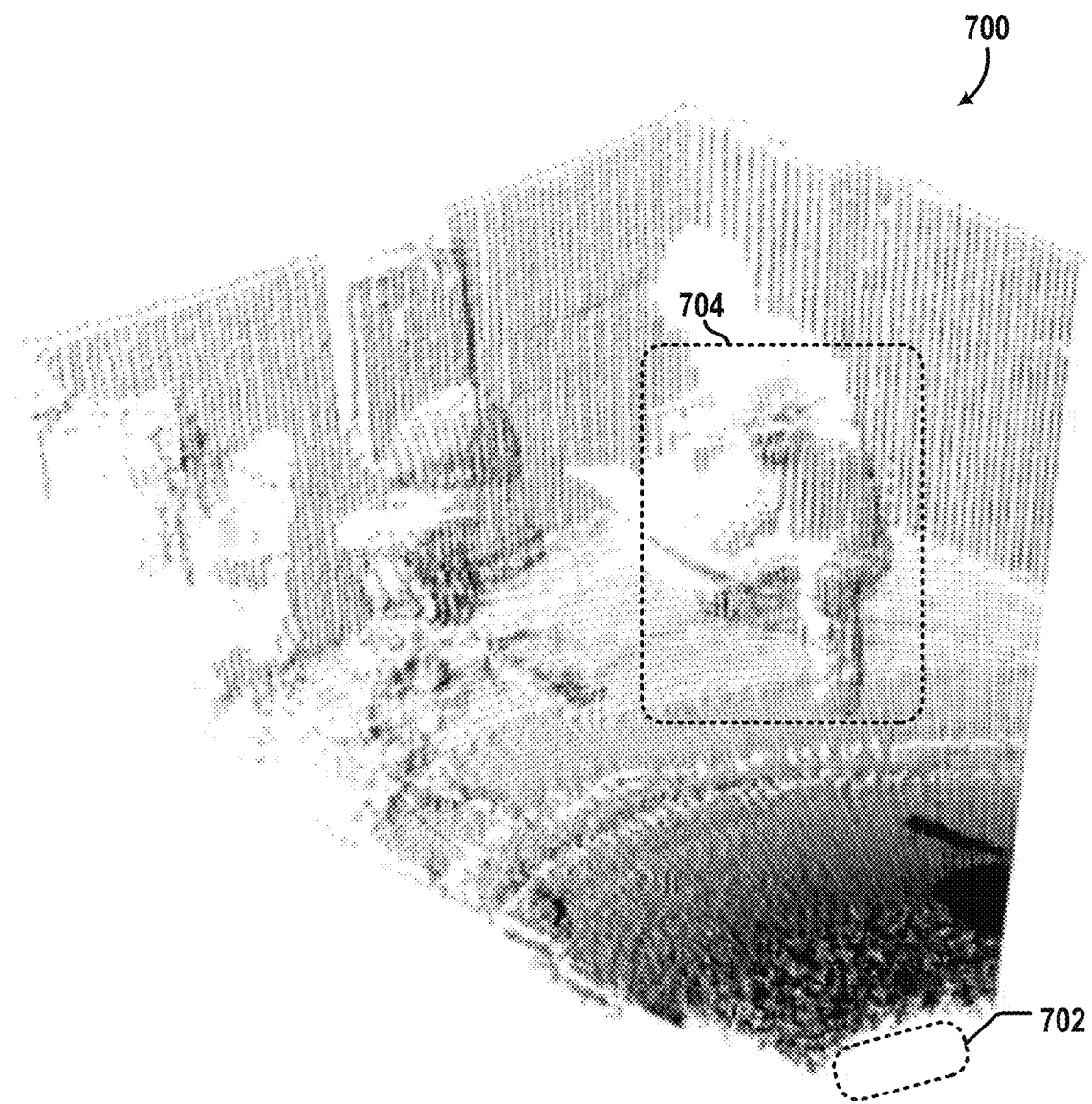
FIG. 7 illustrates a representation of a scene, according to an example embodiment.

FIG. 7 illustrates a representation of a scene 700, according to an example embodiment. As a further illustrative example, FIG. 7 may include another spatial point cloud that may be generated by LIDAR device 300 or 400 as illustrated and described in reference to FIGS. 3A, 3B, 4A, and 4B. Namely, FIG. 7 may include a blind (unscannable) region 702 and a representation of a person 704.

Figure 8:
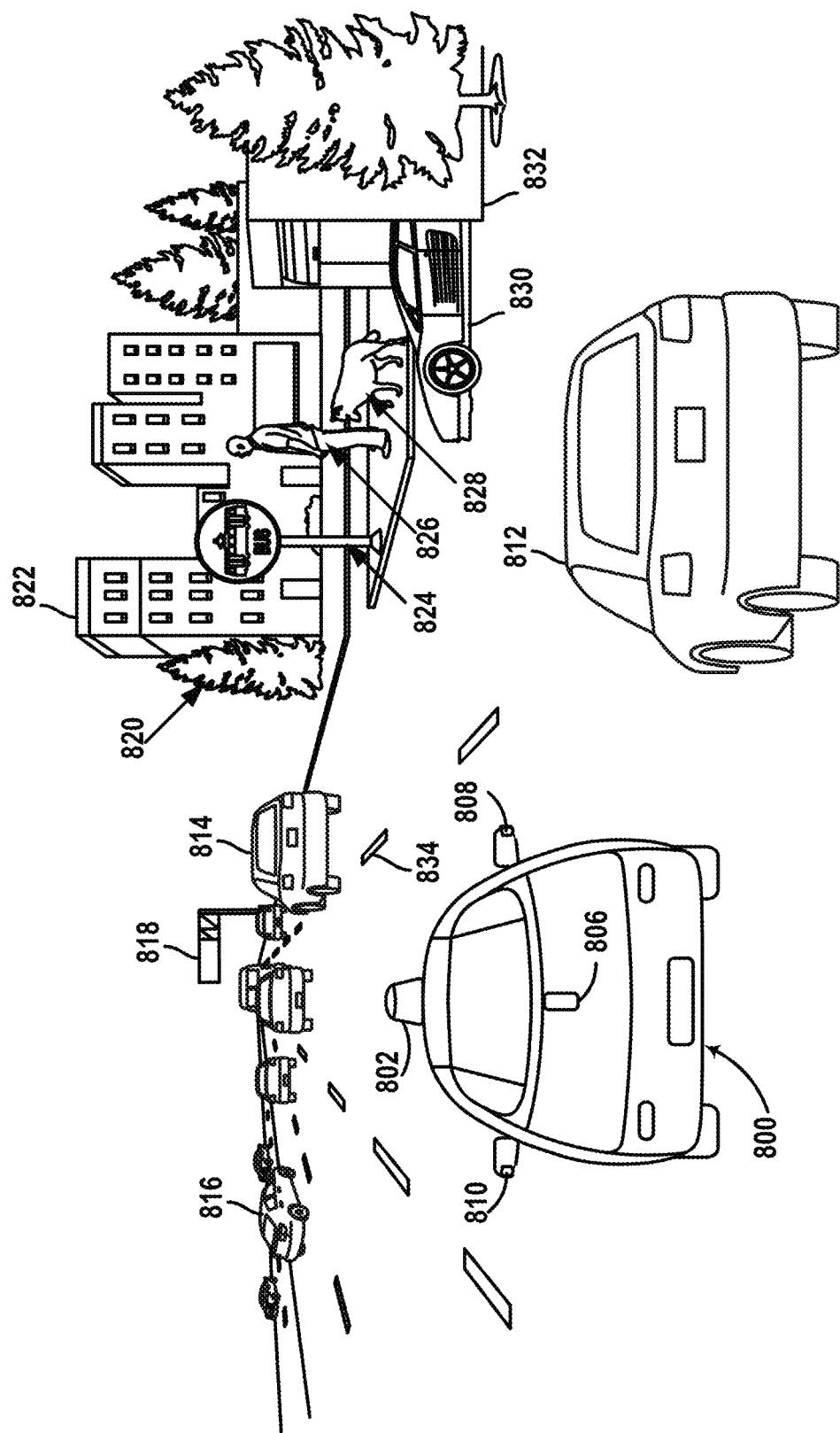
FIG. 8 illustrates a vehicle operating in an environment that includes one or more objects, according to an example embodiment.

FIG. 8 illustrates a vehicle 800 operating in an environment that includes one or more objects, according to an example embodiment. The vehicle 800 may be similar to the vehicle 100. For example, as shown, the vehicle 800 includes sensor units 802, 806, 808, and 810 that are similar, respectively, to the sensor units 102, 106, 108, and 110 of the vehicle 100. For instance, the sensor unit 802 may include a first LIDAR (not shown) and a second LIDAR (not shown) that are similar, respectively, to the first LIDAR 120 and the second LIDAR 122 of the vehicle 100. Further, for instance, each of the sensor units 806-810 may also include a LIDAR similar to the third LIDAR 130 of the vehicle 100. As shown, the environment of the vehicle 800 includes various objects such as cars 812, 814, 816, road sign 818, tree 820, building 822, street sign 824, pedestrian 826, dog 828, car 830, driveway 832, and lane lines including lane line 834. In accordance with the present disclosure, the vehicle 800 may perform the methods and processes herein, such as methods 500-700, to facilitate autonomous operation of the vehicle 800 and/or accidence avoidance by the vehicle 800. Below are example scenarios for operation of the vehicle 800 in accordance with the present disclosure.

In a first scenario, the vehicle 800 may detect the road sign 818 using a medium range LIDAR, similar to the first LIDAR 120 of the vehicle 100. In other words, the first LIDAR 120 or another sensor may provide target information to a controller 230 of the LIDAR system 200. In turn, the vehicle 800 may adjust a viewing direction of a higher resolution LIDAR and/or longer range LIDAR, similar to the second LIDAR 122 of the vehicle 100, to analyze the road sign 818 for information. The higher resolution of the second LIDAR, for instance, may allow resolving the information due to differences of reflectivity of features in the road sign 818. In one instance of the scenario, the road sign may indicate hazards ahead or a closed lane, and the vehicle 800 may adjust its speed or change lanes accordingly. In another instance of the scenario, the road sign may indicate traffic delays ahead, and the vehicle 800 may then instruct a navigation system of the vehicle 800 to determine an alternate route. Other variations of the scenario are possible as well.

In a second scenario, the vehicle 800 may use various sensors to detect and/or identify the various objects illustrated in FIG. 8. The various sensors may provide to controller 230 target information that relates to the environment around vehicle 800. For example, the vehicle 800 may identify the cars 812-816 as moving objects that may be relevant to the navigational behavior of the vehicle 800. Accordingly, the vehicle 800 may use LIDAR device 300 or 400 to track the cars 812-816 and facilitate such navigation. For instance, the vehicle 800 may adjust its speed, or may change lanes to avoid contact with the cars 812-816 based on data from the LIDAR device 300 or 400.

In a third scenario, the vehicle 800 may utilize a first LIDAR of the sensor unit 802, similar to the LIDAR 120 of the vehicle 100, to detect and/or identify the car 814 that is within a threshold distance (e.g., medium range of distances) to the vehicle 800. In the scenario, the car 814 may be in the process of changing lanes to the same lane as the vehicle 800. In the scenario, the vehicle 800 may need to adjust its speed and/or change lanes to maintain a safe distance to the car 814. However, data from the first LIDAR may have a first resolution insufficient to detect whether the car 814 is crossing the lane line 834, or may be insufficient to even detect/identify the lane line 834. Thus, in the scenario, the vehicle 800 may adjust a viewing direction of a second LIDAR, similar to the second LIDAR 122 or the LIDAR device 300 or 400, that is included in the sensor unit 802 and that has a higher second resolution than the first resolution of the first LIDAR. In turn, the vehicle 800 may resolve the lane line 834 and/or whether the car 814 is crossing the lane lines. Alternatively, for instance, the vehicle 800 may utilize the higher resolution of the second LIDAR to detect a left light signal of the car 814 to determine that the vehicle 814 is changing lanes among other possibilities.

In a fourth scenario, the car 816 may be driving erratically or moving at a high speed relative to the vehicle 800 among other possibilities. In this scenario, the vehicle 800 may track the car 816 using the LIDAR device 300 or 400, and may navigate accordingly (e.g., change lanes, adjust speed, etc.) to avoid contact with the car 816.

Other scenarios are possible as well. Thus, the present methods and systems may facilitate autonomous operation and/or accidence avoidance for a vehicle such as the vehicle 800 by utilizing a high-resolution LIDAR system configured to provide information about the environment around vehicle 800.

Figure 9:
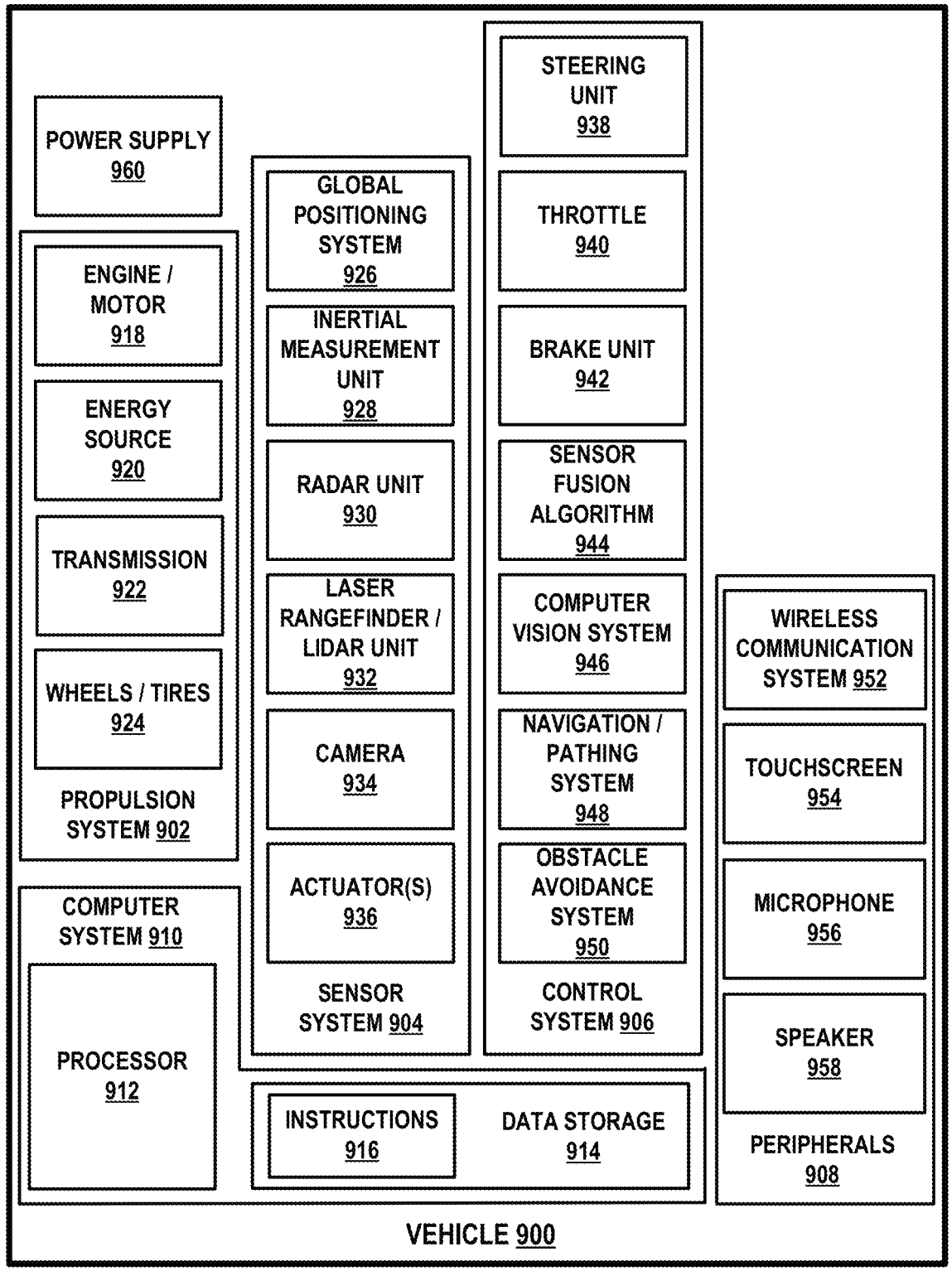
FIG. 9 illustrates a block diagram of a vehicle, according to an example embodiment.

FIG. 9 is a simplified block diagram of a vehicle 900, according to an example embodiment. The vehicle 900 may be similar to the vehicles 100 and/or 800. Further, the vehicle 900 may be configured to perform functions and methods herein such as the methods 500, 600, and/or 700. As shown, the vehicle 900 includes a propulsion system 902, a sensor system 904, a control system 906, peripherals 908, and a computer system 910. In other embodiments, the vehicle 900 may include more, fewer, or different systems, and each system may include more, fewer, or different components. Additionally, the systems and components shown may be combined or divided in any number of ways.

The propulsion system 902 may be configured to provide powered motion for the vehicle 900. As shown, the propulsion system 902 includes an engine/motor 918, an energy source 920, a transmission 922, and wheels/tires 924.

The engine/motor 918 may be or include any combination of an internal combustion engine, an electric motor, a steam engine, and a Stirling engine. Other motors and engines are possible as well. In some embodiments, the propulsion system 902 may include multiple types of engines and/or motors. For instance, a gas-electric hybrid car may include a gasoline engine and an electric motor. Other examples are possible.

The energy source 920 may be a source of energy that powers the engine/motor 918 in full or in part. That is, the engine/motor 918 may be configured to convert the energy source 920 into mechanical energy. Examples of energy sources 920 include gasoline, diesel, propane, other compressed gas-based fuels, ethanol, solar panels, batteries, and other sources of electrical power. The energy source(s) 920 may additionally or alternatively include any combination of fuel tanks, batteries, capacitors, and/or flywheels. In some embodiments, the energy source 920 may provide energy for other systems of the vehicle 900 as well.

The transmission 922 may be configured to transmit mechanical power from the engine/motor 918 to the wheels/tires 924. To this end, the transmission 922 may include a gearbox, clutch, differential, drive shafts, and/or other elements. In embodiments where the transmission 922 includes drive shafts, the drive shafts may include one or more axles that are configured to be coupled to the wheels/tires 924.

The wheels/tires 924 of vehicle 900 may be configured in various formats, including a unicycle, bicycle/motorcycle, tricycle, or car/truck four-wheel format. Other wheel/tire formats are possible as well, such as those including six or more wheels. In any case, the wheels/tires 924 may be configured to rotate differentially with respect to other wheels/tires 924. In some embodiments, the wheels/tires 924 may include at least one wheel that is fixedly attached to the transmission 922 and at least one tire coupled to a rim of the wheel that could make contact with the driving surface. The wheels/tires 924 may include any combination of metal and rubber, or combination of other materials. The propulsion system 902 may additionally or alternatively include components other than those shown.

The sensor system 904 may include a number of sensors configured to sense information about an environment in which the vehicle 900 is located, as well as one or more actuators 936 configured to modify a position and/or orientation of the sensors. As shown, the sensors of the sensor system 904 include a Global Positioning System (GPS) 926, an inertial measurement unit (IMU) 928, a RADAR unit 930, a laser rangefinder and/or LIDAR unit 932, and a camera 934. The sensor system 904 may include additional sensors as well, including, for example, sensors that monitor internal systems of the vehicle 900 (e.g., an $O_2$ monitor, a fuel gauge, an engine oil temperature, etc.). Further, the sensor system 904 may include multiple LIDARs. In some examples, the sensor system 904 may be implemented as multiple sensor units each mounted to the vehicle in a respective position (e.g., top side, bottom side, front side, back side, right side, left side, etc.). Other sensors are possible as well.

The GPS 926 may be any sensor (e.g., location sensor) configured to estimate a geographic location of the vehicle 900. To this end, the GPS 926 may include a transceiver configured to estimate a position of the vehicle 900 with respect to the Earth. The GPS 926 may take other forms as well.

The IMU 928 may be any combination of sensors configured to sense position and orientation changes of the vehicle 900 based on inertial acceleration. In some embodiments, the combination of sensors may include, for example, accelerometers and gyroscopes. Other combinations of sensors are possible as well.

The RADAR unit 930 may be any sensor configured to sense objects in the environment in which the vehicle 900 is located using radio signals. In some embodiments, in addition to sensing the objects, the RADAR unit 930 may additionally be configured to sense the speed and/or heading of the objects.

Similarly, the laser range finder or LIDAR unit 932 may be any sensor configured to sense objects in the environment in which the vehicle 900 is located using lasers. In particular, the laser rangefinder or LIDAR unit 932 may include a laser source and/or laser scanner configured to emit a laser and a detector configured to detect reflections of the laser. The laser rangefinder or LIDAR 932 may be configured to operate in a coherent (e.g., using heterodyne detection) or an incoherent detection mode. In some examples, the LIDAR unit 932 may include multiple LIDARs that each have a unique position and/or configuration suitable for scanning a particular region of an environment around the vehicle 900.

The camera 934 may be any camera (e.g., a still camera, a video camera, etc.) configured to capture images of the environment in which the vehicle 900 is located. To this end, the camera may take any of the forms described above. The sensor system 904 may additionally or alternatively include components other than those shown.

The control system 906 may be configured to control operation of the vehicle 900 and its components. To this end, the control system 906 may include a steering unit 938, a throttle 940, a brake unit 942, a sensor fusion algorithm 944, a computer vision system 946, a navigation or pathing system 948, and an obstacle avoidance system 950.

The steering unit 938 may be any combination of mechanisms configured to adjust the heading of vehicle 900. The throttle 940 may be any combination of mechanisms configured to control the operating speed of the engine/motor 918 and, in turn, the speed of the vehicle 900. The brake unit 942 may be any combination of mechanisms configured to decelerate the vehicle 900. For example, the brake unit 942 may use friction to slow the wheels/tires 924. As another example, the brake unit 942 may convert the kinetic energy of the wheels/tires 924 to electric current. The brake unit 942 may take other forms as well.

The sensor fusion algorithm 944 may be an algorithm (or a computer program product storing an algorithm) configured to accept data from the sensor system 904 as an input. The data may include, for example, data representing information sensed at the sensors of the sensor system 904. The sensor fusion algorithm 944 may include, for example, a Kalman filter, a Bayesian network, an algorithm configured to perform some of the functions of the methods herein, or any another algorithm. The sensor fusion algorithm 944 may further be configured to provide various assessments based on the data from the sensor system 904, including, for example, evaluations of individual objects and/or features in the environment in which the vehicle 100 is located, evaluations of particular situations, and/or evaluations of possible impacts based on particular situations. Other assessments are possible as well.

The computer vision system 946 may be any system configured to process and analyze images captured by the camera 934 in order to identify objects and/or features in the environment in which the vehicle 900 is located, including, for example, traffic signals and obstacles. To this end, the computer vision system 946 may use an object recognition algorithm, a Structure from Motion (SFM) algorithm, video tracking, or other computer vision techniques. In some embodiments, the computer vision system 946 may additionally be configured to map the environment, track objects, estimate the speed of objects, etc.

The navigation and pathing system 948 may be any system configured to determine a driving path for the vehicle 900. The navigation and pathing system 948 may additionally be configured to update the driving path dynamically while the vehicle 900 is in operation. In some embodiments, the navigation and pathing system 948 may be configured to incorporate data from the sensor fusion algorithm 944, the GPS 926, the LIDAR unit 932, and one or more predetermined maps so as to determine the driving path for vehicle 900.

The obstacle avoidance system 950 may be any system configured to identify, evaluate, and avoid or otherwise negotiate obstacles in the environment in which the vehicle 900 is located. The control system 906 may additionally or alternatively include components other than those shown.

Peripherals 908 may be configured to allow the vehicle 900 to interact with external sensors, other vehicles, external computing devices, and/or a user. To this end, the peripherals 908 may include, for example, a wireless communication system 952, a touchscreen 954, a microphone 956, and/or a speaker 958.

The wireless communication system 952 may be any system configured to wirelessly couple to one or more other vehicles, sensors, or other entities, either directly or via a communication network. To this end, the wireless communication system 952 may include an antenna and a chipset for communicating with the other vehicles, sensors, servers, or other entities either directly or via a communication network. The chipset or wireless communication system 952 in general may be arranged to communicate according to one or more types of wireless communication (e.g., protocols) such as BLUETOOTH, communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The wireless communication system 952 may take other forms as well.

The touchscreen 954 may be used by a user to input commands to the vehicle 900. To this end, the touchscreen 954 may be configured to sense at least one of a position and a movement of a user's finger via capacitive sensing, resistance sensing, or a surface acoustic wave process, among other possibilities. The touchscreen 954 may be capable of sensing finger movement in a direction parallel or planar to the touchscreen surface, in a direction normal to the touchscreen surface, or both, and may also be capable of sensing a level of pressure applied to the touchscreen surface. The touchscreen 954 may be formed of one or more translucent or transparent insulating layers and one or more translucent or transparent conducting layers. The touchscreen 954 may take other forms as well.

The microphone 956 may be configured to receive audio (e.g., a voice command or other audio input) from a user of the vehicle 900. Similarly, the speakers 958 may be configured to output audio to the user of the vehicle 900. The peripherals 908 may additionally or alternatively include components other than those shown.

The computer system 910 may be configured to transmit data to, receive data from, interact with, and/or control one or more of the propulsion system 902, the sensor system 904, the control system 906, and the peripherals 908. To this end, the computer system 910 may be communicatively linked to one or more of the propulsion system 902, the sensor system 904, the control system 906, and the peripherals 908 by a system bus, network, and/or other connection mechanism (not shown).

In one example, the computer system 910 may be configured to control operation of the transmission 922 to improve fuel efficiency. As another example, the computer system 910 may be configured to cause the camera 934 to capture images of the environment. As yet another example, the computer system 910 may be configured to store and execute instructions corresponding to the sensor fusion algorithm 944. As still another example, the computer system 910 may be configured to store and execute instructions for determining a 3D representation of the environment around the vehicle 900 using the LIDAR unit 932. Other examples are possible as well.

As shown, the computer system 910 includes the processor 912 and data storage 914. The processor 912 may comprise one or more general-purpose processors and/or one or more special-purpose processors. To the extent the processor 912 includes more than one processor, such processors could work separately or in combination. Data storage 914, in turn, may comprise one or more volatile and/or one or more non-volatile storage components, such as optical, magnetic, and/or organic storage, and data storage 914 may be integrated in whole or in part with the processor 912.

In some embodiments, data storage 914 may contain instructions 916 (e.g., program logic) executable by the processor 912 to execute various vehicle functions (e.g., methods 500-700, etc.). Data storage 914 may contain additional instructions as well, including instructions to transmit data to, receive data from, interact with, and/or control one or more of the propulsion system 902, the sensor system 904, the control system 906, and/or the peripherals 908. The computer system 910 may additionally or alternatively include components other than those shown.

As shown, the vehicle 900 further includes a power supply 960, which may be configured to provide power to some or all of the components of the vehicle 900. To this end, the power supply 960 may include, for example, a rechargeable lithium-ion or lead-acid battery. In some embodiments, one or more banks of batteries could be configured to provide electrical power. Other power supply materials and configurations are possible as well. In some embodiments, the power supply 960 and energy source 920 may be implemented together as one component, as in some all-electric cars.

In some embodiments, the vehicle 900 may include one or more elements in addition to or instead of those shown. For example, the vehicle 900 may include one or more additional interfaces and/or power supplies. Other additional components are possible as well. In such embodiments, data storage 914 may further include instructions executable by the processor 912 to control and/or communicate with the additional components.

Still further, while each of the components and systems are shown to be integrated in the vehicle 900, in some embodiments, one or more components or systems may be removably mounted on or otherwise connected (mechanically or electrically) to the vehicle 900 using wired or wireless connections. The vehicle 900 may take other forms as well.

Figure 10:
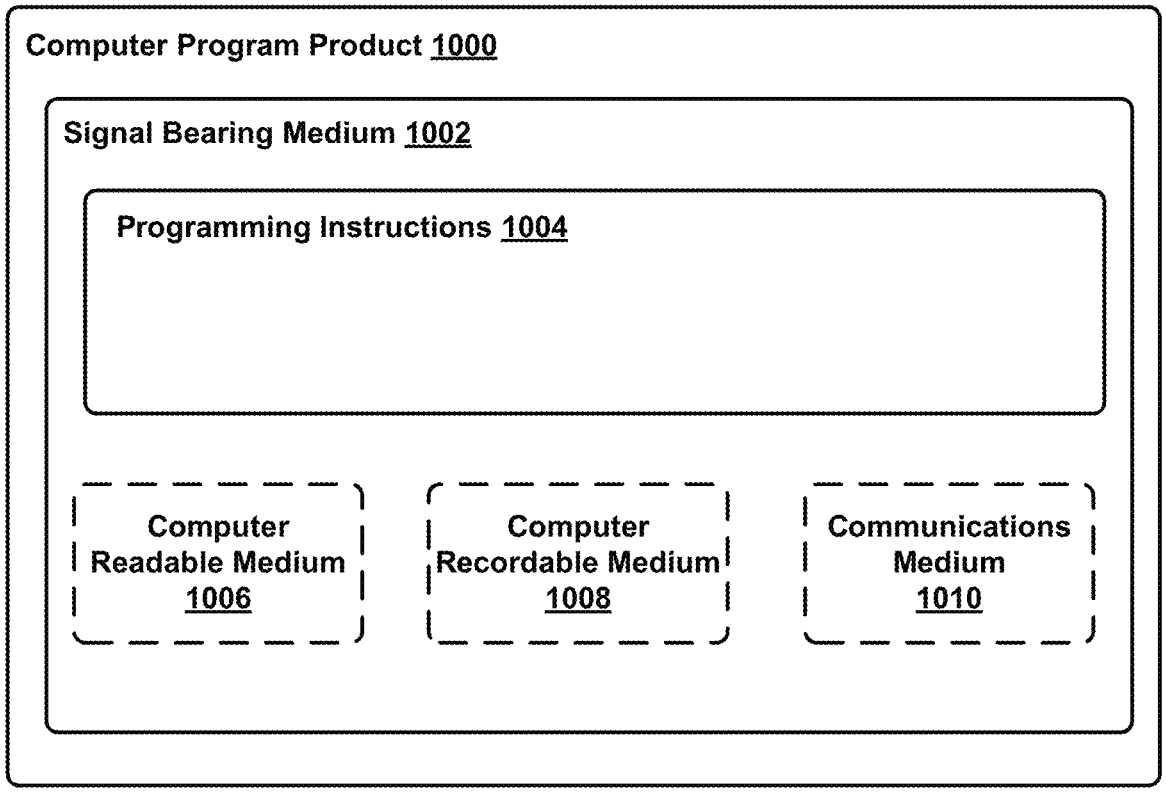
FIG. 10 depicts a computer readable medium configured according to an example embodiment.

FIG. 10 depicts a computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

In some embodiments, the disclosed techniques (e.g., method 1100 below, etc.) may be implemented by computer program instructions encoded on a computer readable storage media in a machine-readable format, or on other media or articles of manufacture (e.g., instructions 916 of the vehicle 900, etc.). FIG. 10 is a schematic illustrating a conceptual partial view of an example computer program product that includes a computer program for executing a computer process on a computing device, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a non-transitory computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

Method Examples

Figure 11:
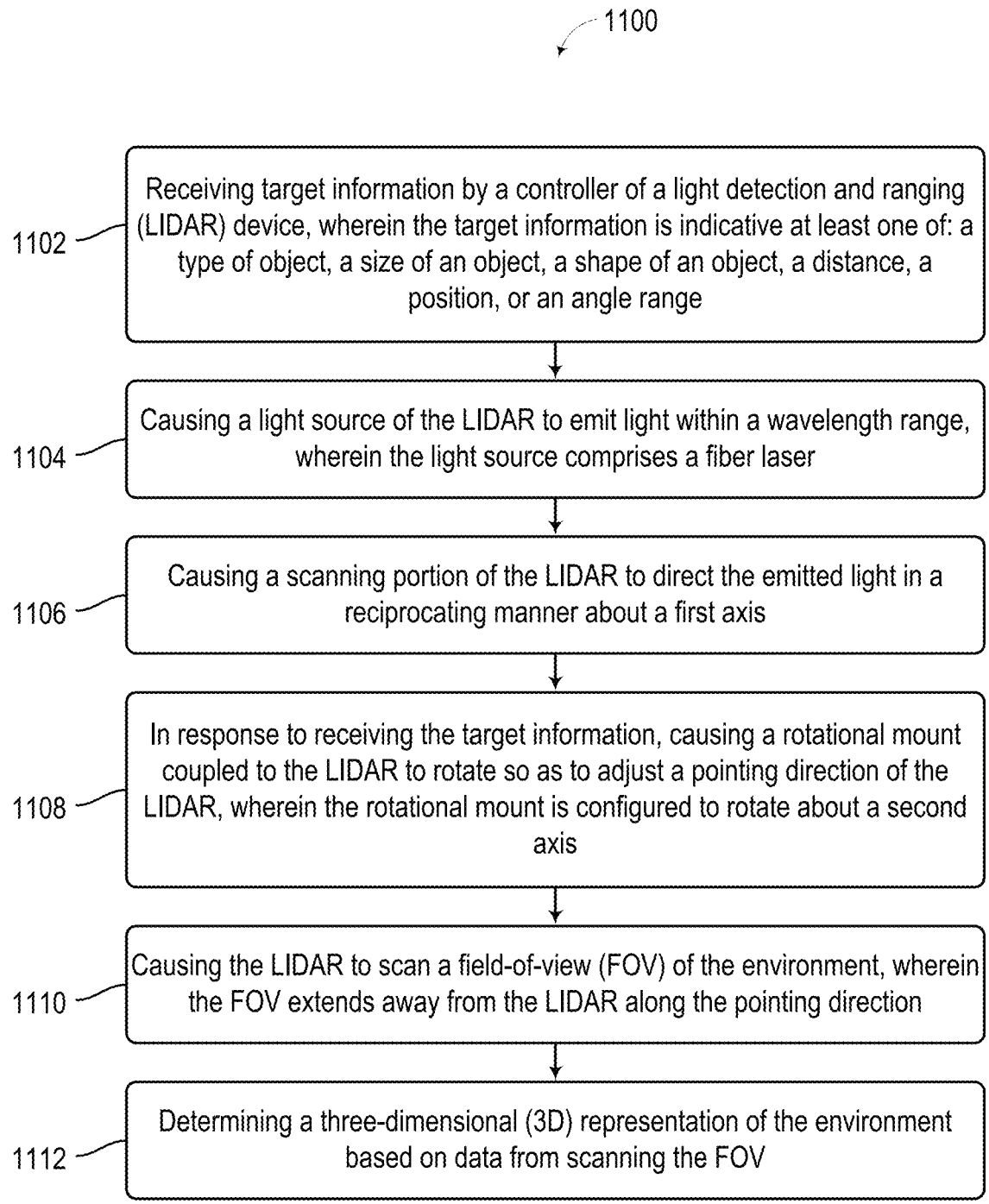
FIG. 11 illustrates a method, according to an example embodiment.

FIG. 11 illustrates a method 1100, according to an example embodiment. The method 1100 includes blocks that may be carried out in any order. Furthermore, various blocks may be added to or subtracted from method 1100 within the intended scope of this disclosure. The method 1100 may correspond to steps that may be carried out using any or all of the systems illustrated and described in reference to FIG. 1A-1E, 2, 3A-3B, 4A-4B, 9, or 10.

Block 1102 includes receiving target information by a controller of a light detection and ranging (LIDAR) device. The target information may be received from another sensing device or based on an expected location of an object or a particular location. In other words, the target information may be indicative at least one of: a type of object, a size of an object, a shape of an object, a distance, a position, or an angle range.

Block 1104 includes causing a light source of the LIDAR to emit light within a wavelength range, wherein the light source comprises a fiber laser. As discussed above, the light source may be configured to emit light at one or more wavelengths, e.g. 1550 nm.

Block 1106 includes causing a scanning portion of the LIDAR to direct the emitted light in a reciprocating manner about a first axis. The scanning portion of the LIDAR may include a moveable mirror, a spring, and an actuator. The spring and the actuator may be configured to move the moveable mirror in a back-and-forth motion about the first axis at a resonant frequency. The resonant frequency could be 140 Hz or another frequency.

Block 1108 includes, in response to receiving the target information, causing a rotational mount coupled to the LIDAR to rotate so as to adjust a pointing direction of the LIDAR. In an example embodiment, the rotational mount is configured to rotate about a second axis. The second axis could be a vertical axis that runs through the roof and floor of the vehicle. Thus, in response to receiving target information about a target at a particular direction of interest, the rotational mount may be configured to rotate the moveable mirror such that the emitted light is directed or steered towards the particular direction of interest.

Block 1110 includes causing the LIDAR to scan a field-of-view (FOV) of the environment, wherein the FOV extends away from the LIDAR along the pointing direction. Scanning could include controlling one or both of the rotational mount and/or the moveable mirror so as to illuminate the FOV with emitted light and receive the reflected, emitted light at one or more detectors associated with the LIDAR.

Block 1112 includes determining a three-dimensional (3D) representation of the environment based on data from scanning the FOV. As described above, the LIDAR system may include one or more detectors configured to receive emitted light that has been reflected from objects in the environment around the vehicle. Thus, based on the received light, the LIDAR system may produce a point cloud map that may be indicative of the vehicle's environment. The point cloud map may be used for navigation, object recognition, obstacle avoidance, and/or other functions.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A device comprising:
    a light detection and ranging (LIDAR) device, wherein the LIDAR device is configured to obtain data within a first region, and wherein the LIDAR device comprises:
        a light source configured to emit light; and
        a plurality of detectors;
    a further LIDAR device, wherein the further LIDAR device is configured to obtain data within a second region, and wherein the first and second regions do not fully overlap horizontally; and
    a controller configured to:
        receive target or directional information based on an initial three-dimensional (3D) representation of an environment of the device;
        in response to receiving the target or directional information, cause an adjustment to a pointing direction of the LIDAR device;
        cause the LIDAR device to scan a field-of-view (FOV) of the environment; and
        provide information indicative of a 3D representation of the environment based on data from scanning the FOV.

2. The device of claim 1, wherein the light source comprises a laser.

3. The device of claim 1, further comprising:
    a housing, wherein at least the scanning portion is disposed within the housing, and wherein a wall of the housing comprises a light filter configured to allow the emitted light to propagate through the light filter; and
    a rotational mount configured to rotate at least a portion of the LIDAR device about a second axis.

4. The device of claim 3 wherein the housing is positioned at a top side of a vehicle, wherein the second axis comprises an axis passing through the top side of the vehicle, and wherein the rotational mount is configured to rotate within a 360 degree range of motion about the second axis.

5. The device of claim 3 wherein the light filter has a dome shape, and wherein the light filter is configured to attenuate visible light propagating into the housing.

6. A system comprising:
a vehicle;
a sensing device configured to provide environmental data indicative of an environment around the vehicle, wherein the sensing device is coupled to the vehicle;
a light detection and ranging (LIDAR) device, wherein the LIDAR device is configured to obtain data within a first region, and wherein the LIDAR device is coupled to the vehicle;
a further LIDAR device, wherein the further LIDAR device is configured to obtain data within a second region, and wherein the first and second regions do not fully overlap horizontally; and
a controller configured to:
receive the environmental data from the sensing device, wherein the environmental data comprises target or directional information based on an initial three-dimensional (3D) representation of an environment of the vehicle;
cause an adjustment to a pointing direction of the LIDAR device based at least on the target or directional information;
cause the LIDAR device to scan a field-of-view (FOV) of the environment; and
providing information indicative of a 3D representation of the environment based on data from scanning the FOV.

7. The system of claim 6 wherein the LIDAR device comprises a light source, wherein the light source comprises a laser.

8. The system of claim 7, wherein the laser is configured to emit light having a wavelength of 1550 nm.

9. The system of claim 6 wherein the LIDAR device further comprises a scanning portion.

10. The system of claim 9 wherein at least the scanning portion of the LIDAR device is disposed within a housing, wherein the housing is positioned at a top side of the vehicle, wherein a second axis comprises an axis passing through the top side of the vehicle, and wherein a rotational mount is configured to rotate at least a portion of the LIDAR device within a 360 degree range of motion about the second axis.

11. The system of claim 10 wherein the housing comprises a light filter, wherein the light filter has a dome shape, and wherein the light filter is configured to attenuate visible light propagating into the housing.

12. The system of claim 6, wherein the target or directional information is further indicative of at least one of: a type of object, a size of an object, a shape of an object, a position, a location, or an angle range.

13. A method comprising:
receiving target or directional information by a controller of a light detection and ranging (LIDAR) device configured to obtain data within a first region, wherein the target or directional information is based on an initial three-dimensional (3D) representation of an environment of the LIDAR device and is indicative at least one of: a type of object, a size of an object, a shape of an object, a distance, a position, or an angle range;
in response to receiving the target or directional information, causing the LIDAR device to adjust a pointing direction of the LIDAR device;
causing a light source of the LIDAR device to emit light, wherein the light source comprises a laser;
causing the LIDAR device to scan a field-of-view (FOV) of the environment, wherein the FOV extends away from the LIDAR device along the pointing direction;
determining a 3D representation of the environment based on data from scanning the FOV; and
causing a further LIDAR configured to obtain data within a second region, wherein the first and second regions do not fully overlap horizontally, to scan a FOV of the environment corresponding to a second region; and
determining a 3D representation of the environment corresponding to the second region.

14. The method of claim 13, wherein the LIDAR device is coupled to a rotational mount, and wherein adjusting the pointing direction of the LIDAR device comprises causing the rotational mount to rotate at least a portion of the LIDAR device about a rotational axis.

15. The method of claim 13 further comprising identifying at least one object in the environment based on the 3D representation.

16. The system of claim 6 wherein the sensing device comprises at least one of a RADAR device, a sonar transducer, and a second LIDAR device.

17. The device of claim 1 wherein the LIDAR device and the further LIDAR device are independently movable.

18. The method of claim 13 wherein causing the further LIDAR to scan a FOV of the environment comprises causing the further LIDAR to move independently of the LIDAR device.

19. The device of claim 1 wherein the first region extends further from the device than the second region.

20. The device of claim 1 wherein the first region is horizontally entirely within the second region.

* * * * *